(12) United States Patent
Zhou et al.

(10) Patent No.: US 10,856,203 B2
(45) Date of Patent: Dec. 1, 2020

(54) SIGNALING FOR LINK AGGREGATION SETUP AND RECONFIGURATION

(71) Applicant: QUALCOMM Incorporated, San Diego, CA (US)

(72) Inventors: Yan Zhou, San Diego, CA (US); Abhishek Pramod Patil, San Diego, CA (US); Alfred Asterjadhi, San Diego, CA (US); Venkata Ramanan Venkatachalam Jayaraman, San Diego, CA (US); George Cherian, San Diego, CA (US); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 15/870,606

(22) Filed: Jan. 12, 2018

(65) Prior Publication Data

US 2018/0206284 A1    Jul. 19, 2018

Related U.S. Application Data

(60) Provisional application No. 62/448,326, filed on Jan. 19, 2017.

(51) Int. Cl.
*H04W 40/02* (2009.01)
*H04L 29/12* (2006.01)
(Continued)

(52) U.S. Cl.
CPC .......... *H04W 40/02* (2013.01); *H04B 1/0483* (2013.01); *H04B 1/1615* (2013.01);
(Continued)

(58) Field of Classification Search
None
See application file for complete search history.

(56) References Cited

U.S. PATENT DOCUMENTS

2004/0081199 A1   4/2004  Lopez et al.
2010/0284476 A1   11/2010  Potkonjak
(Continued)

FOREIGN PATENT DOCUMENTS

WO   WO-2010118371 A1   10/2010

OTHER PUBLICATIONS

HTC: "Clarifications on LWA and LWIP", 3GPP Draft; 36300_CR0935_(REL-14)_R2-168096, 3rd Generation Partnership Project (3GPP), Mobile Competence Centre; 650, Route Des Lucioles: F-06921 Sophia-Antipolis Cedex; France, vol. RAN WG2, No. Reno, USA: Nov. 14, 2016-Nov. 18, 2016, Dec. 9, 2016 (Dec. 9, 2016), XP051191741, Retrieved from the Internet: URL:http://www.3gpp.org/tsg_ran/WG2_RL2/Specifications/201612_draft_specs_after_RAN _74/ [retrieved on Dec. 9, 2016].
(Continued)

*Primary Examiner* — Mohammad S Adhami
(74) *Attorney, Agent, or Firm* — Holland & Hart LLP/Qualcomm

(57) ABSTRACT

Methods, systems, and devices for wireless communication are described. A wireless device may identify an aggregation capability to communicate in parallel over a plurality of wireless links. The wireless device may in some cases broadcast this aggregation capability (e.g., periodically). Additionally or alternatively, the wireless device may transmit the aggregation capability in response to a request received from another wireless device. In some cases, the first wireless device may transmit a request to a second wireless device inquiring about aggregation capabilities of the second wireless device. The second wireless device may
(Continued)

respond with its aggregation capabilities (e.g., or may broadcast its aggregation capabilities independently of receiving the response). The wireless devices may establish a multi-link session based at least in part on the indicated aggregation capabilities.

21 Claims, 20 Drawing Sheets

(51) Int. Cl.

| | | |
|---|---|---|
| H04L 12/709 | (2013.01) | |
| H04B 1/16 | (2006.01) | |
| H04L 29/06 | (2006.01) | |
| H04B 1/04 | (2006.01) | |
| H04L 1/16 | (2006.01) | |
| H04W 76/14 | (2018.01) | |
| H04W 76/15 | (2018.01) | |
| H04L 5/00 | (2006.01) | |
| H04W 28/02 | (2009.01) | |
| H04W 28/06 | (2009.01) | |
| H04W 48/16 | (2009.01) | |
| H04W 52/02 | (2009.01) | |
| H04L 29/08 | (2006.01) | |
| H04W 72/08 | (2009.01) | |
| H04L 12/801 | (2013.01) | |
| H04W 8/22 | (2009.01) | |
| H04W 84/12 | (2009.01) | |
| H04W 88/10 | (2009.01) | |
| H04L 12/891 | (2013.01) | |

(52) U.S. Cl.
CPC .......... *H04L 1/1621* (2013.01); *H04L 1/1628* (2013.01); *H04L 5/0053* (2013.01); *H04L 45/245* (2013.01); *H04L 61/6022* (2013.01); *H04L 65/607* (2013.01); *H04L 67/14* (2013.01); *H04W 28/0215* (2013.01); *H04W 28/0221* (2013.01); *H04W 28/06* (2013.01); *H04W 48/16* (2013.01); *H04W 52/0216* (2013.01); *H04W 52/0229* (2013.01); *H04W 72/085* (2013.01); *H04W 76/14* (2018.02); *H04W 76/15* (2018.02); *H04L 5/0055* (2013.01); *H04L 47/34* (2013.01); *H04L 47/41* (2013.01); *H04W 8/22* (2013.01); *H04W 84/12* (2013.01); *H04W 88/10* (2013.01); *Y02D 70/00* (2018.01); *Y02D 70/10* (2018.01); *Y02D 70/14* (2018.01); *Y02D 70/142* (2018.01); *Y02D 70/146* (2018.01); *Y02D 70/22* (2018.01); *Y02D 70/40* (2018.01)

(56) References Cited

U.S. PATENT DOCUMENTS

| | | |
|---|---|---|
| 2012/0281564 A1 | 11/2012 | Zhang et al. |
| 2013/0077554 A1 | 3/2013 | Gauvreau et al. |
| 2013/0114546 A1 | 5/2013 | Stanwood et al. |
| 2014/0254349 A1 | 9/2014 | Jia et al. |
| 2014/0313932 A1 | 10/2014 | Saltsidis et al. |
| 2015/0117357 A1 | 4/2015 | Ozturk et al. |
| 2015/0282174 A1* | 10/2015 | Takeda .............. H04W 72/1268 370/280 |
| 2015/0288599 A1* | 10/2015 | Zhou ..................... H04L 45/245 370/338 |
| 2016/0073429 A1* | 3/2016 | Oteri ................. H04W 74/0816 370/338 |
| 2016/0285746 A1 | 9/2016 | Parron et al. |
| 2018/0054847 A1* | 2/2018 | Cariou .................. H04W 76/15 |
| 2018/0205502 A1 | 7/2018 | Merlin et al. |
| 2018/0206174 A1 | 7/2018 | Zhou et al. |
| 2018/0324828 A1* | 11/2018 | Mukherjee ............ H04L 5/0042 |
| 2018/0376374 A1* | 12/2018 | Trainin ................. H04W 72/08 |
| 2019/0150214 A1 | 5/2019 | Zhou et al. |

OTHER PUBLICATIONS

Intel Corporation: "UE Capabilities for eLWA", 3GPP Draft; R2-168583—UE Capabilities for Elwa, 3rd Generation Partnership Project (3GPP), Mobile Competence Centre; 650, Route Des Lucioles; F-06921 Sophia-Antipolis Cedex; France, vol. RAN WG2, No. Reno, Nevada, USA; Nov. 14, 2016-Nov. 18, 2016, Nov. 13, 2016 (Nov. 13, 2016), XP051178154, Retrieved from the Internet: URL:http://www.3gpp.org/ftp/Meetings_3GPP SYNC/RAN2/Docs/ [retrieved on Nov. 13, 2016].

Partial International Search Report—PCT/US2018/014059—ISA/EPO—dated May 9, 2018.

Samsung: "Discussion on LWA Flow Control", 3GPP Draft; R3-152469_DICS of Flow Control, 3rd Generation Partnership Project (3GPP), Mobile Competence Centre 650, Route Des Lucioles; F-06921 Sophia-Antipolis Cedex France, vol. RAN WG3, No. Anaheim, U.S.A.; Nov. 16, 2015-2015112016, Nov. 2015 (Nov. 16, 2015), XP051007344, 6 Pages, Retrieved from Internet: URL:http://www.3gpp.org/ftp/Meetings_3GPP_SYNC/RAN3/Docs/ [retrieved on Nov. 16, 2015].

International Search Report and Written Opinion—PCT/US2018/014055—ISA/EPO—dated May 9, 2018.

Huawei, et al., "L2 Reordering and Retransmission Functions", 3GPP Draft; R2-166195, 3rd Generation Partnership Project (3GPP), Mobile Competence Centre; 650, Route Des Lucioles; F-06921 Sophia-Antipolis Cedex; France, vol. RAN WG2, no. Kaohsiung; Oct. 10, 2016-Oct. 14, 2016, Oct. 9, 2016 (Oct. 9, 2016), 5 Pages, XP051150809, Retrieved from the Internet: URL: http://www.3gpp.org/ftp/Meetings_3GPP_SYNC/RAN2/Docs/ [retrieved on Oct. 9, 2016].

\* cited by examiner

SIGNALING FOR LINK AGGREGATION SETUP AND RECONFIGURATION

CROSS REFERENCES

The present application for patent claims priority to U.S. Provisional Patent Application No. 62/448,326 to Zhou et. al., titled "WI-FI MULTICHANNEL AGGREGATION", filed Jan. 19, 2017, assigned to the assignee hereof, which is hereby incorporated by reference in its entirety.

BACKGROUND

The following relates generally to wireless communication, and more specifically to signaling for link aggregation setup and reconfiguration.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink and uplink. The downlink (or forward link) may refer to the communication link from the AP to the STA, and the uplink (or reverse link) may refer to the communication link from the STA to the AP.

Some wireless communications systems may support multi-link aggregation, where transmissions may be communicated in parallel over two or more links between two wireless devices (e.g., AP and STA) during a communications session. Such a multi-link session may benefit a wireless system in terms of increased data throughput, trunking gains, reduced latency, and decreased power consumption. Each link of a multi-link session may be associated with respective physical components and logical processing components of a given wireless device, and these components may be used to support multi-link communications. Such an architecture may allow for independent or joint control of two or more wireless links in the multi-link session. Multi-link communications may benefit from improved techniques to setup and tear down wireless links.

SUMMARY

The described techniques relate to improved methods, systems, devices, or apparatuses that support signaling for link aggregation setup and reconfiguration. In aspects of the following, link reconfiguration may be understood to include link setup and tear down. Similarly, link setup may in some cases be understood to include aggregation capability exchange as well as initial link configuration for the multi-link session. Generally, the described techniques provide for signaling (e.g., over-the-air (OTA) signaling) used for link aggregation setup (configuration), reconfiguration, and tear down. Such signaling may include an indication of an aggregation capability of a given wireless device. By way of example, each wireless device (e.g., which may be a STA or AP, and may in some cases be referred to as a node) may broadcast its supported aggregation types. Such aggregation types may include packet-based aggregation and/or flow-based aggregation types and techniques. Additionally or alternatively, a wireless device may indicate a supported aggregation type, for example in a unicast transmission such as a probe response or an association response. In other examples, the wireless device may multicast or broadcast the response. For both packet-based aggregation and flow-based aggregation, wireless devices may communicate setup options, reconfiguration options, and teardown options (e.g., in addition to other control information). Considerations for these communications are outlined below, including methods for conveying the control information (e.g., using a management frame, a control frame, new control fields in existing frames, etc.).

By way of example, in the case of packet-based aggregation, all traffic flows (e.g., or frame types or traffic identifiers (TIDs)) may be aggregated over the same set of links. In such examples, link setup, reconfiguration, and tear down may use negotiation of a common transmitter address (TA) and receiver address (RA) across links. In other examples, a set of traffic flows (e.g., or frame types or TIDs) may be aggregated over a particular set of links. In such examples, the link setup, reconfiguration, and tear down operations may additionally require an indication of the set of traffic flows and/or the set of links to be aggregated. Similarly, in the case of flow-based aggregation, link setup, reconfiguration, and tear down operations may be based at least in part on a TID and/or a corresponding link identifier. In each of these examples, the aggregation information may be conveyed in data frames, control frames, management frames, existing control fields of a frame, and/or new control fields defined for a frame, such as fields in a data, control, and/or management frame.

A method of wireless communication is described. The method may include identifying first aggregation capability information indicating a capability of the first wireless device to communicate in parallel over a plurality of wireless links, receiving second aggregation capability information from the second wireless device, the second aggregation capability information indicating a capability of the second wireless device to communicate in parallel over the plurality of wireless links, and establishing the multi-link session between the first wireless device and the second wireless device based at least in part on the identified first aggregation capability information and the received second aggregation capability information.

An apparatus for wireless communication is described. The apparatus may include means for identifying first aggregation capability information indicating a capability of the first wireless device to communicate in parallel over a plurality of wireless links, means for receiving second aggregation capability information from the second wireless device, the second aggregation capability information indicating a capability of the second wireless device to communicate in parallel over the plurality of wireless links, and means for establishing the multi-link session between the first wireless device and the second wireless device based at least in part on the identified first aggregation capability information and the received second aggregation capability information.

Another apparatus for wireless communication is described. The apparatus may include a processor, memory in electronic communication with the processor, and instructions stored in the memory. The instructions may be operable to cause the processor to identify first aggregation capability information indicating a capability of the first wireless device to communicate in parallel over a plurality of wireless links, receive second aggregation capability information from the second wireless device, the second aggregation capability information indicating a capability of the second wireless device to communicate in parallel over the plurality of wireless links, and establish the multi-link session between the first wireless device and the second wireless device based at least in part on the identified first aggregation capability information and the received second aggregation capability information.

A non-transitory computer-readable medium for wireless communication is described. The non-transitory computer-readable medium may include instructions operable to cause a processor to identify first aggregation capability information indicating a capability of the first wireless device to communicate in parallel over a plurality of wireless links, receive second aggregation capability information from the second wireless device, the second aggregation capability information indicating a capability of the second wireless device to communicate in parallel over the plurality of wireless links, and establish the multi-link session between the first wireless device and the second wireless device based at least in part on the identified first aggregation capability information and the received second aggregation capability information.

Some examples of the method, apparatus, and non-transitory computer-readable medium described above may further include processes, features, means, or instructions for transmitting a request for the second aggregation capability information of the second wireless device, wherein the second aggregation capability information may be received from the second wireless device based at least in part on the transmitted request.

In some examples of the method, apparatus, and non-transitory computer-readable medium described above, receiving the second aggregation capability information from the second wireless device comprises: receiving receive a management frame, a control frame, or a data frame that includes the second aggregation capability information.

In some examples of the method, apparatus, and non-transitory computer-readable medium described above, the management frame, the control frame, or the data frame comprises a beacon, or a probe response, or an association response, or a dedicated action frame, or a control field in the management frame, or a control field in the control frame, or a control field in the data frame, or a combination thereof.

Some examples of the method, apparatus, and non-transitory computer-readable medium described above may further include processes, features, means, or instructions for receiving a request for the first aggregation capability information from the second wireless device. Some examples of the method, apparatus, and non-transitory computer-readable medium described above may further include processes, features, means, or instructions for transmitting, to the second wireless device in response to the received request, the first aggregation capability information of the first wireless device.

In some examples of the method, apparatus, and non-transitory computer-readable medium described above, the first aggregation capability information comprises an indication of a duration for which the first wireless device may be willing to communicate in parallel over the plurality of wireless links.

In some examples of the method, apparatus, and non-transitory computer-readable medium described above, receiving the request for the first aggregation capability information comprises: receiving a management frame, a control frame, or a data frame that includes the request for the first aggregation capability information.

In some examples of the method, apparatus, and non-transitory computer-readable medium described above, the management frame, the control frame, or the data frame comprises a probe request, or an association request, or a dedicated action frame, or a control field in the management frame, or a control field in the control frame, or a control field in the data frame, or a combination thereof.

In some examples of the method, apparatus, and non-transitory computer-readable medium described above, the second aggregation capability information may be received with the received request for the first aggregation capability information.

Some examples of the method, apparatus, and non-transitory computer-readable medium described above may further include processes, features, means, or instructions for advertising the first aggregation capability information of the first wireless device.

Some examples of the method, apparatus, and non-transitory computer-readable medium described above may further include processes, features, means, or instructions for transmitting a request for configuration information of the second wireless device for the multi-link session. Some examples of the method, apparatus, and non-transitory computer-readable medium described above may further include processes, features, means, or instructions for receiving the configuration information from the second wireless device in response to the transmitted request.

Some examples of the method, apparatus, and non-transitory computer-readable medium described above may further include processes, features, means, or instructions for modifying one or more of the plurality of wireless links based at least in part on configuration information of the first wireless device for the multi-link session and the configuration information received from the second wireless device.

Some examples of the method, apparatus, and non-transitory computer-readable medium described above may further include processes, features, means, or instructions for receiving, from the second wireless device, a request for configuration information of the first wireless device for the multi-link session. Some examples of the method, apparatus, and non-transitory computer-readable medium described above may further include processes, features, means, or instructions for transmitting the configuration information of the first wireless device to the second wireless device in response to the received request.

Some examples of the method, apparatus, and non-transitory computer-readable medium described above may further include processes, features, means, or instructions for modifying one or more of the plurality of wireless links based at least in part on the configuration information of the first wireless device and configuration information received from the second wireless device for the multi-link session.

In some examples of the method, apparatus, and non-transitory computer-readable medium described above, the first aggregation capability information, or the second aggregation capability information, or both comprise an aggregation type, or link identification information, or a receive queue size, or a block acknowledgement bitmap size, or an indication of fragmentation support, or a combination thereof.

Some examples of the method, apparatus, and non-transitory computer-readable medium described above may further include processes, features, means, or instructions for transmitting a reconfiguration request for the multi-link session to the second wireless device.

In some examples of the method, apparatus, and non-transitory computer-readable medium described above, the reconfiguration request comprises a traffic identifier, or a flow identifier, or a frame type, or a combination thereof associated with a wireless link of the plurality of wireless links.

In some examples of the method, apparatus, and non-transitory computer-readable medium described above, the reconfiguration request further comprises a link identifier associated with the wireless link.

Some examples of the method, apparatus, and non-transitory computer-readable medium described above may further include processes, features, means, or instructions for receiving, from the second wireless device, a response to the reconfiguration request comprising an indication of at least one reconfigured wireless link of the plurality of wireless links. Some examples of the method, apparatus, and non-transitory computer-readable medium described above may further include processes, features, means, or instructions for communicating with the second wireless device based at least in part on the received response to the reconfiguration request.

Some examples of the method, apparatus, and non-transitory computer-readable medium described above may further include processes, features, means, or instructions for transmitting a first set of packets to the second wireless device via a first wireless link of the plurality of wireless links, the first set of packets associated with a first traffic identifier. Some examples of the method, apparatus, and non-transitory computer-readable medium described above may further include processes, features, means, or instructions for transmitting a second set of packets to the second wireless device via a second wireless link of the plurality of wireless links, the second set of packets associated with the first traffic identifier.

Some examples of the method, apparatus, and non-transitory computer-readable medium described above may further include processes, features, means, or instructions for transmitting a first set of packets to the second wireless device via a first wireless link of the plurality of wireless links, the first set of packets associated with a first traffic identifier. Some examples of the method, apparatus, and non-transitory computer-readable medium described above may further include processes, features, means, or instructions for transmitting a second set of packets to the second wireless device via a second wireless link of the plurality of wireless links, the second set of packets associated with a second traffic identifier.

Some examples of the method, apparatus, and non-transitory computer-readable medium described above may further include processes, features, means, or instructions for identifying a transmission type for a set of packets to be transmitted to the second wireless device, the transmission type comprising broadcast, multicast, or unicast. Some examples of the method, apparatus, and non-transitory computer-readable medium described above may further include processes, features, means, or instructions for transmitting the set of packets over a first wireless link of the plurality of wireless links based at least in part on identifying the transmission type for the set of packets as broadcast, or multicast, or a combination thereof, or transmitting the set of packets over a second wireless link of the plurality of wireless links based at least in part on identifying the transmission type for the set of packets as unicast.

Some examples of the method, apparatus, and non-transitory computer-readable medium described above may further include processes, features, means, or instructions for identifying a frame type for a set of packets to be transmitted to the second wireless device, the frame type comprising data, control, or management. Some examples of the method, apparatus, and non-transitory computer-readable medium described above may further include processes, features, means, or instructions for transmitting the set of packets over a first wireless link of the plurality of wireless links based at least in part on identifying the frame type for the set of packets as data, or transmitting the set of packets over a second wireless link of the plurality of wireless links based at least in part on identifying the frame type for the set of packets as control, or management, or a combination thereof.

In some examples of the method, apparatus, and non-transitory computer-readable medium described above, at least one of the plurality of wireless links comprises a channel in a shared radio frequency spectrum band.

In some examples of the method, apparatus, and non-transitory computer-readable medium described above, a first wireless link of the plurality of wireless links may be in a first radio frequency spectrum band having a first path loss value. In some examples of the method, apparatus, and non-transitory computer-readable medium described above, a second wireless link of the plurality of wireless links may be in a second radio frequency spectrum band having a second path loss value that may be greater than the first path loss value.

DETAILED DESCRIPTION

Figure 1:
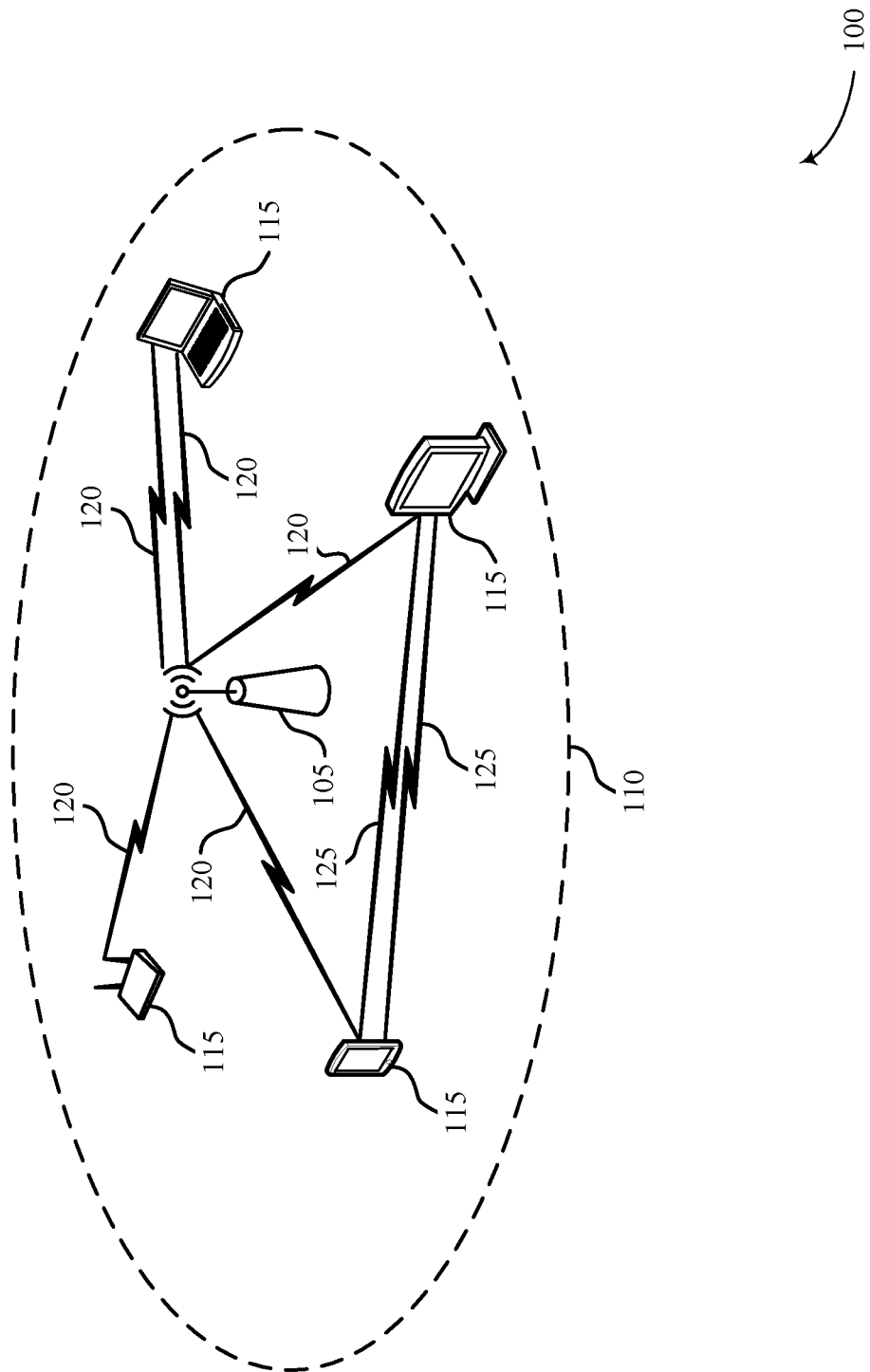
FIG. 1 illustrates an example of a system for wireless communication that supports signaling for link aggregation setup and reconfiguration in accordance with aspects of the present disclosure.

Some wireless communications systems may support multiple, parallel wireless links between communicating devices, for example, to increase throughput, to improve link efficiency, to reduce latency, etc. A wireless link may refer to a communication path between devices, and each wireless link may support one or more channels (e.g., logical entities) that support multiplexing of data, such that during at least some duration of time, transmissions or portions of transmissions may occur over both links at the same time, either synchronously or asynchronously. The wireless links may be in the same or different radio frequency (RF) spectrum bands. Each link of a multi-link session may be associated with respective physical components (e.g., antennas, amplifiers, including power amplifiers and low noise amplifiers, etc.) and/or logical processing components (e.g., physical (PHY) layers, media access control (MAC) layers, etc.) of a given wireless device, and these components may be configured to support multi-link communications. Such parallel communications, while benefiting the system in terms of throughput, may increase the complexity of the system. For example, these communications may benefit from improved signaling to indicate a capability, configuration, or both, of one or both communicating devices to participate in a multi-link session. Considerations for such control signaling are discussed below.

By way of example, a first wireless device (e.g., a STA or AP) may prefer to aggregate communications with a second wireless device for at least some duration of time. In various examples, this preference may be based on one or more of a variety of factors (e.g., an amount of data to be communicated, an availability of wireless resources, a power level of at least one of the wireless devices). To initiate communications using link aggregation, the first wireless device may acquire aggregation capability information of the second wireless device and compare the acquired aggregation capability information with its own capabilities. Examples of aggregation capability information that may be exchanged include a type of aggregation (e.g., flow-based aggregation or packet-based aggregation), a RF spectrum for which aggregation may be supported, a maximum or preferred number of links that may be supported at the same time, a duration of time for which aggregation may be supported, etc. Upon identifying a mutually supported aggregation scheme, the first and second wireless devices may exchange control signaling to setup (or configure), reconfigure, or tear down one or more links associated with the multi-link session in accordance with techniques described below. In some cases, the wireless devices may establish a single link, exchange the supported capability information, then establish one or more additional links that are aggregated for the multi-link session.

Aspects of the disclosure are initially described in the context of a wireless communications system. Aspects of the disclosure are then described with reference to process flow diagrams. Aspects of the disclosure are further illustrated by and described with reference to apparatus diagrams, system diagrams, and flowcharts that relate to signaling for link aggregation setup and reconfiguration.

FIG. 1 illustrates a WLAN 100 (also known as a Wi-Fi network) configured in accordance with various aspects of the present disclosure. The WLAN 100 may include an AP 105 and multiple associated STAs 115, which may represent devices such as wireless communication terminals, including mobile stations, phones, personal digital assistant (PDAs), other handheld devices, netbooks, notebook computers, tablet computers, laptops, display devices (e.g., TVs, computer monitors, etc.), printers, etc. The AP 105 and the associated stations 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the WLAN 100. An extended network station associated with the WLAN 100 may be connected to a wired or wireless distribution system that may allow multiple APs 105 to be connected in an ESS.

A STA 115 may be located in the intersection of more than one coverage area 110 and may associate with more than one AP 105. A single AP 105 and an associated set of STAs 115 may be referred to as a BSS. An ESS is a set of connected BSSs. A distribution system may be used to connect APs 105 in an ESS. In some cases, the coverage area 110 of an AP 105 may be divided into sectors. The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 125 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, 802.11az, 802.11ba, etc. In other implementations, peer-to-peer connections or ad hoc networks may be implemented within WLAN 100. Devices in WLAN 100 may communicate over unlicensed spectrum, which may be a portion of spectrum that includes frequency bands traditionally used by Wi-Fi technology, such as the 5 GHz band, the 2.4 GHz band, the 60 GHz band, the 3.6 GHz band, and/or the 900 MHz band. The unlicensed spectrum may also include other frequency bands.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., carrier-sense multiple access (CSMA)/collision avoidance (CA)) because the STAs 115 may not refrain from transmitting on top of each other. A STA 115 whose transmissions are not identifiable, but that is within the same coverage area 110 may be known as a hidden node. CSMA/CA may be supplemented by the exchange of a request-to-send (RTS) packet transmitted by a sending STA 115 (or AP 105) and a clear-to-send (CTS) packet transmitted by the receiving STA 115 (or AP 105). This exchange may alert other devices within range of the sender and receiver not to transmit for the duration of the primary transmission. Thus, RTS/CTS handshake may help mitigate a hidden node problem.

In a system supporting multi-link aggregation (which may also be referred to as multi-channel aggregation), some of the traffic associated with a single STA 115 may be transmitted across multiple, parallel communication links 120 (which may also be referred to as "links" or "wireless links" herein). Multi-link aggregation may thus provide a means to increase network capacity and maximize the utilization of available resources. In some cases, each communication link 120 for a given wireless device may be associated with a respective radio of the wireless device (e.g., where a radio comprises transmit/receive chains, physical antennas, signal processing components, etc.).

Multi-link aggregation may be implemented in a number of ways. As a first example, the multi-link aggregation may be referred to as packet-based. In packet-based aggregation, frames of a single traffic flow (e.g., all traffic associated with a given TID) may be sent concurrently across multiple communication links 120 (e.g., on multiple channels). In some cases, the multiple communication links 120 may operate in the same radio frequency (RF) spectrum band (e.g., each link may be in the 5 GHz band, and use channels in the 5 GHz band). In other cases, the multiple communication links 120 may be in different RF spectrum bands (e.g., one may be in the 2.4 GHz band while another is in the 5 GHz band). Each link may be associated with a different PHY and lower MAC layer, which may perform link-specific operations such as CSMA. In such an implementation, management of the aggregation of the separate communication links 120 may be performed at a higher MAC layer. The multi-link aggregation implemented at the lower MAC layers and PHY layers may be transparent to the upper layers of the wireless device. Packet-based aggregation may in some cases provide improved user-perceived throughput (UPT) and sum throughput (e.g., even for a single traffic flow) relative to other aggregation architectures and non-aggregated communications.

As another example, the multi-link aggregation may be referred to as flow-based. In flow-based aggregation, each traffic flow (e.g., all traffic associated with a given TID) may be sent using one of multiple available communication links 120. As an example, a single STA 115 may access a web browser while streaming a video in parallel. The traffic associated with the web browser access may be communicated over a first channel of a first communication link 120 while the traffic associated with the video stream may be communicated over a second channel of a second communication link 120 in parallel (e.g., at least some of the data may be transmitted on the first channel concurrent with data transmitted on the second channel). In some examples, the transmissions on the first communication link 120 and the second communication link 120 may be synchronized. In other examples, the transmissions may be asynchronous. As described above, the channels may belong to the same RF band or to different RF bands. In the case of three communication links 120 (or other number of communication links greater than two), all three communication links 120 may support operation over the same RF band. In other cases, two communication links 120, but not the third, may support operation over the same RF band. Or, in still other cases each of the three communication links 120 may support operation for a separate RF band. In some cases, flow-based aggregation may not use cross-link packet scheduling and reordering (e.g., which may be used to support packet-based aggregation). Alternatively, in the case of a single flow (e.g., in the case that the STA 115 simply attempts to access a web browser), aggregation gain may not be available. Each link may be associated with a different PHY and lower MAC layer, which may perform link-specific operations such as CSMA. Traffic flows may be mapped to communication links 120 by a higher MAC layer, as described further below.

In other embodiments, a hybrid of flow-based and packet-based aggregation may be employed. As an example, a device may employ flow-based aggregation in situations in which multiple traffic flows are created and may employ packet-based aggregation in other situations. The decision to switch between multi-link aggregation techniques (e.g., modes) may additionally or alternatively be based on other metrics (e.g., a time of day, traffic load within the network, battery power for a wireless device, etc.). It is to be understood that while aspects of the preceding are described in the context of a multi-link session involving two (or more) communication links 120, the described concepts may be extended to a multi-link session involving multiple direct wireless links 125.

To support the described multi-link aggregation techniques, APs 105 and STAs 115 may exchange supported aggregation capability information (e.g. supported aggregation type, supported frequency bands, etc.). In some cases, the exchange of information may occur via data, control, or management frames. In some examples, the data, control, or management frames may be a beacon signal, a probe request and response, an association request and response, dedicated action frames, an operating mode indicator (OMI), etc. In other examples, other types of data, control, or management frames may be used. In some cases, an AP 105 may designate a given channel in a given band as an anchor link (e.g., the wireless link on which it transmits beacons and other control or management frames), which may also be referred to as an anchor channel. In this case, the AP 105 may transmit beacons (e.g., which may contain less information) on other channels or links for discovery purposes. Although described as being frequency-based, the anchor link could additionally or alternatively refer to a point in time (e.g., an AP 105 may transmit its beacon at a certain time on one or more links).

In some examples, in multi-link aggregation, each link may use its own transmit queue. In other examples, a common transmit queue may be used. In some examples, each link may have a unique TA and RA. In other examples, the TA and RA may be common across the multiple links used for multi-link aggregation. In some cases, one or more of a sequence number (SN), frame number (FN), and/or packet number (PN) may be common across the communication links. Other items that may be common across links include encryption keys, MAC packet data unit (MPDU) generation and/or encryption, aggregated MAC service data unit (AMSDU) constraints, fragment size, reordering, replay check, and/or de-fragmentation techniques. In other examples, encryption keys may be per-link.

In various examples, block acknowledgements (BAs) may be sent in response to multi-link transmissions. A BA may refer to an acknowledgment (ACK) for multiple MPDUs sent together (e.g., an ACK for a block of MPDUs). Both the transmitting device (e.g., the device requesting the BA) and the receiving device (e.g., the device transmitting the BA) may maintain a sliding window (e.g., a BA window), and may have previously negotiated the size of the BA. For example, a BA session may have a BA size of 64 MPDUs (e.g., other BA size examples may include 256 MPDUs, 1024 MPDUs, etc.). In such cases, a transmitting device may transmit 64 MPDUs followed by a block acknowledgment request (BAR). In response to the BAR, the receiving device may, upon reception of the 64 MPDUs and the BAR, transmit a BA to the transmitting device. The BA may indicate whether all 64 MPDUs were received correctly, which MPDUs are missing, etc. In some cases, a BA may be used to indicate the longer BA window, or a capability exchange or agreement defining the larger BA window may also be sent. In other examples, a single SN may be used, but with multiple scorecards (e.g., one per channel or link), or with a global scorecard as well as per-link scorecards. Multi-link aggregation (e.g., flow-based and/or packet-based) may increase network capacity by efficiently allocating utilization of multiple links (and multiple channels).

Figure 2:
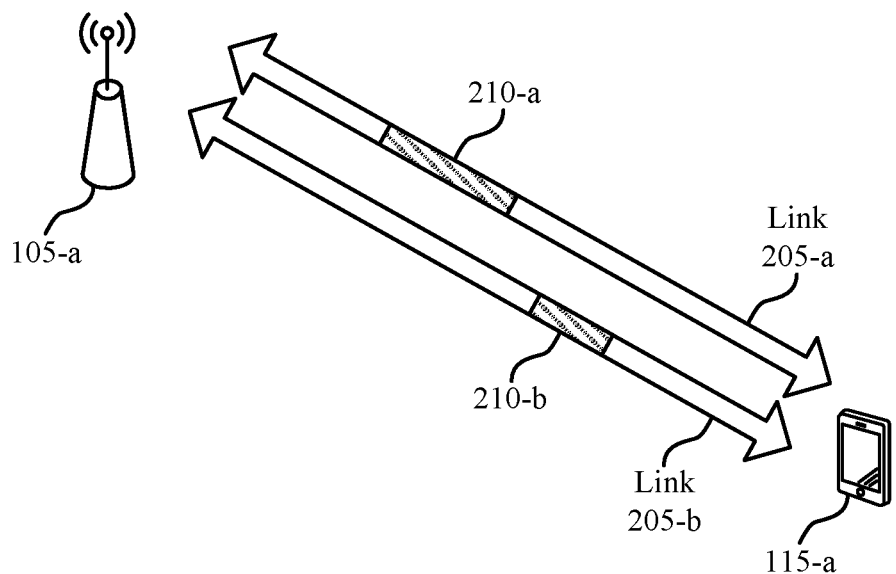
FIG. 2 illustrates an example of a wireless communications system that supports signaling for link aggregation setup and reconfiguration in accordance with aspects of the present disclosure.

FIG. 2 illustrates an example of a WLAN 200 that supports signaling for link aggregation setup and reconfiguration in accordance with aspects of the present disclosure.

In some examples, WLAN 200 may implement aspects of WLAN 100. A wireless connection between AP 105-*a* and STA 115-*a* may be referred to as a link 205 or a communication link, and each link may include one or more channels. As an example, WLAN 200 may support multi-link aggregation such that AP 105-*a* and STA 115-*a* may communicate in parallel over two or more links (e.g., link 205-*a* and link 205-*b*). STA 115-*a* may thus receive packets (e.g., MPDUs) over both link 205-*a* and link 205-*b* from AP 105-*a*. Such parallel communications 210-*a* and 210-*b* over the two or more links may be synchronized (e.g., simultaneous) or unsynchronized (e.g., asynchronous), and may be uplink, or downlink, or a combination of uplink and downlink during a particular duration of time. As described above, the parallel communications 210-*a* and 210-*b* over the two or more links may occur between two STAs 115 (e.g., which may be referred to as sidelink communication) without deviating from the scope of the present disclosure.

Such multi-link aggregation may provide multiple benefits to WLAN 200. For example, multi-link aggregation may improve UPT. For example, per-user transmit queues may be more quickly drained or flushed. In some examples, the transmit queue may be more quickly drained of packets where multiple links are available to transmit each packet. For example, where communications on one link is delayed, for example because of temporary interference, packets may continue to be transmitted over a second link (or a third link, or fourth link, etc.). That is, multi-link aggregation may reduce latency of communications by providing more opportunities to transmit packets. Similarly, multi-link aggregation may improve throughput for WLAN 200 by improving utilization of available channels (e.g., by increasing trunking gains). That is, multi-link aggregation may increase spectral utilization, and may increase the bandwidth-time product. Networks that do not support multi-link aggregation may experience under-utilization of spectrum in non-uniform (e.g., bursty) traffic conditions.

Further, multi-link aggregation may enable smooth transitions between multi-band radios (e.g., where each radio may be associated with a given RF band) and/or enable a framework to setup separation of control channels and data channels. Other benefits of multi-link aggregation include reducing the ON time of a modem, which may benefit a wireless device in terms of power consumption, though the final power-saving gains may in some cases depend on other factors including processing requirements, RF bandwidth, etc. Multi-link aggregation additionally increases multiplexing opportunities in the case of a single BSS. That is, multi-link aggregation may increase the number of users per multiplexed transmission served by the multi-link AP 105-*a*.

However, multi-link aggregation may also have implementation challenges. Techniques for communicating control information for a multi-link session are discussed in detail below. In some cases, multi-link aggregation may be supported (including initiated) through signaling between STA 115-*a* and AP 105-*a* (or a peer STA 115). As an example, STA 115-*a* may indicate to AP 105-*a* (or the peer STA 115) whether it supports multi-link aggregation. For example, STA 115-*a* may indicate that it supports multi-link aggregation in general, for a particular RF spectrum band, for a link 205 of a given RF spectrum band, etc. Such signaling could be static (e.g., in the form of data, control, or management frames such as beacons, probes, association or reassociation frames, etc.), semi-static, or dynamic (e.g., via OMI or other similar operational parameters). In some cases, AP 105-*a* (e.g., or the peer STA 115) may decide whether to aggregate communications with STA 115-*a* based at least in part on the capabilities advertised by STA 115-*a*.

In some cases, AP 105-*a* may designate a given channel as an anchor link (e.g., the channel on which it transmits control information). This control information may be included in data, control, or management frames such as beacons, probe responses, association responses, control fields, etc. In some examples, AP 105-*a* may transmit varying amounts of control information on different channels (e.g., for discovery purposes). Examples of aggregation capability information which may be included in such control information are described below. In some examples, the aggregation capability information of a given device (e.g., STA 115-*a* or AP 105-*a*) may be solicited (e.g., via a probe request, an association request, a dedicated action frame, another data frame, control frame, or management frame, etc.) by another device to identify potential aggregation options.

Additionally or alternatively, the signaling used to support multi-link aggregation may include an indication of whether the wireless device (e.g., STA 115-*a*) supports parallel reception and transmission. For example, STA 115-*a* may advertise this capability (e.g., via a capability field) in its data, control, or management frames (e.g., beacons, probes, association or reassociation frames, etc.) as with the static signaling discussed above. Additionally or alternatively, the STA 115-*a* may indicate the capability dynamically (e.g., may explicitly signal in ongoing transmissions that it can support parallel reception and transmission, may solicit immediate BA response only if it can support parallel transmission and reception, etc.)

In some examples, the aggregation capability information includes a supported MAC aggregation type (e.g., MAC-level packet-based, MAC-level flow-based, internet protocol (IP)-level packet-based, transport-level based, hypertext transfer protocol (HTTP)-level based, any combination thereof, etc.). In some cases (e.g., for packet or flow-based aggregation), the aggregation capability information includes information specific to one or more TIDs, flows, or frame types. By way of example, the aggregation capability information may include identifiers of specific links 205 to be aggregated (e.g., where the link identifier may be in the form of a channel number, a BSS identifier (BSSID), a per-link TA, a per-link RA, any combination or subset thereof, etc.). The aggregation capability information may additionally or alternatively include one or more of a supported reordering queue size for the receiver (e.g., STA 115-*a*), a supported BA bitmap size (e.g., 1024 bits), or an indication of support for fragmentation. In the case that fragmentation is supported, the information may include a maximum number of concurrently fragmented MSDUs, a supported minimum fragment size, a supported maximum fragment size, an indication of a support for AMSDU fragmentation, any combination thereof, etc.

In a first example, all TIDs (e.g., or flow IDs, or frame types) may be aggregated over link 205-*a* and link 205-*b*. This may be an example of packet-based aggregation. That is, parallel communications 210-*a* and 210-*b* may each have at least one packet having a common TID. In this example, aggregation setup, reconfiguration, and tear down may be initiated by a request and response exchange (e.g., as described with reference to FIG. 4). For example, the request and response exchange may negotiate an aggregation type within types supported by both sides (e.g., which may be determined based on the exchange of aggregation capability information discussed above and described in detail with reference to FIG. 3). Additionally or alternatively, the request and response exchange may negotiate common TA and RA across links 205-a and 205-b (e.g., if the selected aggregation type uses a common BA session for communications sent across both links 205-a and 205-b). In some cases, the aggregated links (e.g., links 205-a and 205-b) may be all available links between AP 105-a and STA 115-a (e.g., or they may be a subset of the available links). In this example, aggregation may be reconfigured (e.g., or torn down) for all TIDs via message exchange. For example, an ACK frame may be used to respond to a request to reconfigure the link. In some examples, the exchange may be on a designated link 205. Additionally or alternatively, the exchange may be via dedicated data frames, control frames, or management frames, via high efficiency (HE) control fields (e.g., in a new field of an OMI HE transmission), or via another control field in a data frame, a control frame, or a management frame.

In another example of packet-based aggregation, a set of TIDs may be aggregated over a particular set of links. In such examples, aggregation may be torn down (e.g., or reconfigured) for a set of TIDs (e.g., or flows or frame types). For example, broadcast flows, multicast flows, control information, etc., may be aggregated over links closable by all receiving STAs 115 (e.g., one or more 900 MHz links) while other flows (e.g., unicast data) may be aggregated over other links which may have a higher path loss (e.g., one or more 5 GHz links). In examples in which a given set of TIDs are associated with a particular set of links, link setup, reconfiguration, and teardown requests may indicate the relevant set of TIDs and/or link IDs. For example, the TID set may be indicated by explicit TID types or may be pre-defined and indicated with a corresponding set index. As an example, TIDs corresponding to a particular access category (AC) or a group of access categories may be indicated by the AC group index. For example, a given AC group may include AC voice and AC video, etc. In other examples, flow IDs corresponding to a given traffic type (e.g., broadcast traffic) or frame types corresponding to BA and BAR frames may be explicitly indicated in the requests. In some cases, the request may include link IDs for the links 205 to be aggregated. For example, a link 205 may be identified by a channel number, a BSSID, a per-link TA, a per-link RA, any combination thereof, etc.

In some cases (e.g., for flow-based aggregation), a wireless device may request to setup, reconfigure, or tear down a set of links associated with a set of TIDs (e.g., or flow IDs or frame types). For example, if link 205-a supports a first set of TIDs and the link 205-a suddenly suffers from quality degradation, STA 115-a or AP 105-a may identify link 205-a for reconfiguration. As discussed in some examples above, the aggregation setup, reconfiguration, and teardown may be initiated by a request and response exchange. For example, the request may include the TIDs (e.g., or flow IDs or frame types) and corresponding link IDs. In some examples, the exchange may be on a designated link 205. Additionally or alternatively, the exchange may be via dedicated data frames, control frames, or management frames, via HE control fields (e.g., in a new field of an OMI HE control transmission), or via another control field in a data frame, a control frame, or a management frame.

Figure 3:
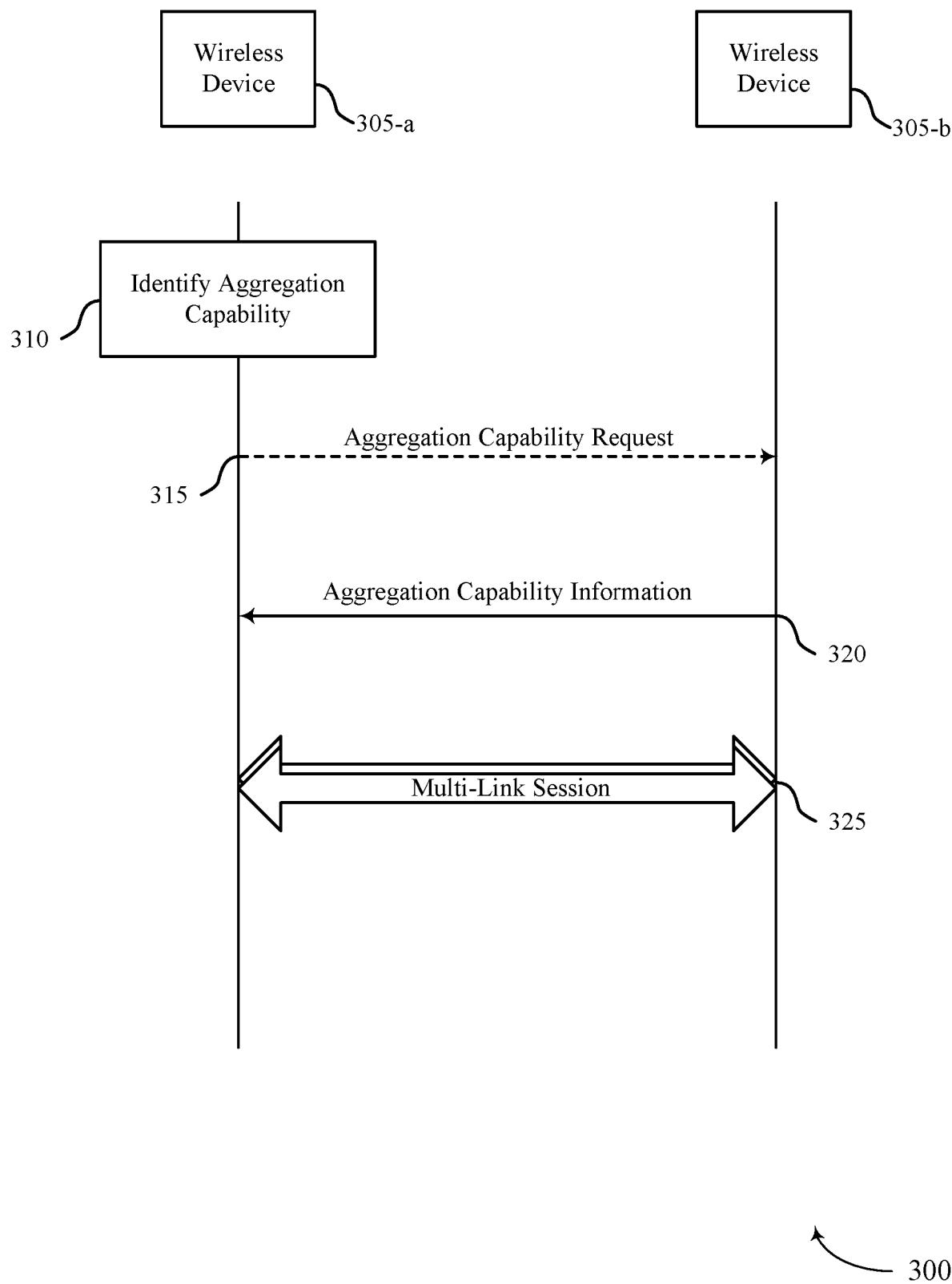
FIGS. 3 through 5 illustrate example process flows that support signaling for link aggregation setup and reconfiguration in accordance with aspects of the present disclosure.

FIG. 3 illustrates a process flow 300 that supports signaling for link aggregation setup and reconfiguration in accordance with aspects of the present disclosure. Process flow 300 may implement aspects of WLAN 100. For example, process flow 300 includes wireless device 305-a and wireless device 305-b, each of which may be an example of a STA 115 or an AP 105 as described with reference to WLAN 100.

At 310, wireless device 305-a may identify its current aggregation capability. For example, the aggregation capability may in some cases be dynamically or semi-statically determined (e.g., based on a power level, communication load, interference metrics, location, etc.). Alternatively, the aggregation capability may in some cases be preconfigured, in which case wireless device 305-a may still be said to identify its current aggregation capability. Examples of aggregation capability information include RF spectrum band(s) over which aggregation is supported, a maximum number of supported aggregated links, an aggregation type (e.g., packet-based or flow-based), a duration of time for which wireless device 305-a is willing to aggregate communications, etc.

At 315, wireless device 305-a may optionally transmit an aggregation capability request to one or more neighboring wireless devices 305-b. For example, wireless device 305-a may be a STA 115 inquiring about aggregation capabilities of nearby APs 105 (e.g., or other STAs 115). Alternatively, wireless device 305-a may be an AP 105 inquiring about an aggregation capability of a STA 115. Examples of aggregation capability requests may include data frames, control frames, or management frames such as probe requests, association requests, dedicated action frames, control fields (e.g., HE control fields) in frames, a control field in a data frame, a control field in a management frame, etc. In some cases, the aggregation capability request may include a duration of time for which wireless device 305-a wants to participate in aggregated communications (e.g., in a multi-link session). That is, wireless device 305-a may in some cases include its own aggregation capability information in a request for aggregation capability information of wireless device 305-b.

At 320, wireless device 305-b may transmit its own aggregation capability information. In some cases, this transmission may be in response to receiving the aggregation capability request at 315. Examples of such transmissions include data frames, control frames, or management frames such as probe responses, association responses, dedicated action frames, HE control fields, a control field in a data frame, a control field in a management frame, etc. Alternatively, wireless device 305-b may in some cases transmit its aggregation capability independently of receiving an aggregation capability request (e.g., wireless device 305-b may advertise its aggregation capabilities). For example, wireless device 305-b may identify its own aggregation capability (e.g., analogously to 310 as discussed with reference to wireless device 305-a) and may broadcast this information (e.g., via a beacon). Examples of aggregation capability information include an aggregation type (e.g., packet-based), link identification information (e.g., a TA, RA, TID, etc.), a receive queue size, a BA bitmap size, an indication of fragmentation support, or a combination of these. In some cases, the aggregation capability information may indicate a duration for which that wireless device 305-b is willing to aggregate communications.

At 325, wireless device 305-a and wireless device 305-b may establish a multi-link session. In some cases, a first wireless link of the multi-link session may be in a first RF spectrum band having a first path loss value (e.g., a 2.4 GHz spectrum band), and a second wireless link of the multi-link session may be in a second RF spectrum band having a second path loss value that is greater than the first path loss value (e.g., a 5 GHz spectrum band, or a 60 GHz spectrum band). Alternatively, the first and second wireless links may in some cases be located in a same RF band. In some examples, at least one link of the multi-link session may include a channel in a shared RF spectrum band. During the multi-link session, a first set of packets may be sent via a first wireless link and a second set of packets may be sent via a second wireless link. For example, the first set of packets and the second set of packets (e.g., or some subset thereof) may be associated with a same TID (e.g., in the case of packet-based aggregation). Additionally or alternatively, the first set of packets may be associated with a first TID and the second set of packets may be associated with a second TID (e.g., in the case of flow-based aggregation).

In some cases, wireless device 305-a (e.g., or wireless device 305-b) may identify a transmission type for a set of packets to be transmitted, where the transmission type includes one of broadcast, multicast, or unicast, and determine a wireless link for the packets based on the transmission type. Similarly, wireless device 305-a may allocate data frames to a first wireless link and management (e.g., or control) frames to a second wireless link. That is, wireless device 305-a (e.g., or wireless device 305-b) may identify a frame type for a set of packets to be transmitted, where the frame type comprises data, control, or management, and transmit the set of packets over a given wireless link according to the identified frame type. By way of example, broadcast flows, multicast flows, and/or control frames may be aggregated over links closable by all receiving devices (e.g., 2.4 GHz and 900 MHz links).

Figure 4:
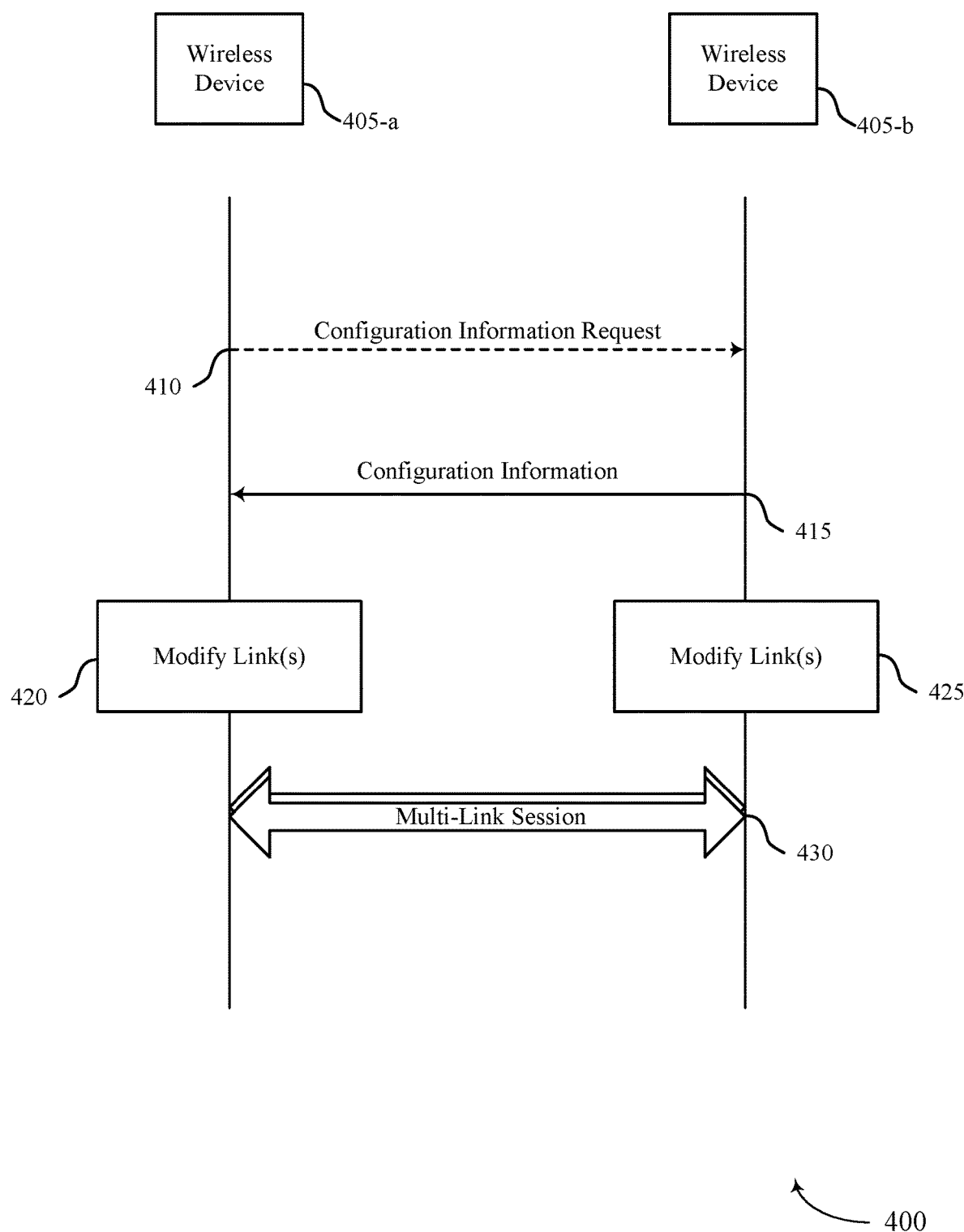

FIG. 4 illustrates a process flow 400 that supports signaling for link aggregation setup and reconfiguration in accordance with aspects of the present disclosure. Process flow 400 may implement aspects of WLAN 100. For example, process flow 400 includes wireless device 405-a and wireless device 405-b, each of which may be an example of a STA 115 or an AP 105 as described with reference to WLAN 100.

Prior to 410, wireless device 405-a and wireless device 405-b may have established a multi-link session (e.g., using techniques described with reference to FIG. 3). In various examples described below, each of wireless device 405-a and wireless device 405-b may be an example of either of wireless devices 305-a and 305-b. For example, in some cases wireless device 405-a may be an example of wireless device 305-a (e.g., the device that initiates the exchange of the aggregation capability information with an aggregation capability request) and wireless device 405-b may be an example of wireless device 305-b. Additionally or alternatively, wireless device 405-a may be an example of wireless device 305-b, and wireless device 405-b may be an example of wireless device 305-a. Thus, different permutations may be realized when combining the operations of process flows 300 and 400 without deviating from the scope of the present disclosure.

At 410, wireless device 405-a may optionally transmit a request for configuration information (e.g., or reconfiguration information) of wireless device 405-b. That is, the link aggregation setup may be initiated by a request. In some cases, the request may initiate negotiation of an aggregation type within aggregation types supported by both wireless device 405-a and wireless device 405-b. Additionally or alternatively, the request may initiate negotiation of a common TA and/or RA (e.g., if the aggregation type uses a common BA session across all links), etc.

At 415, wireless device 405-b may transmit configuration information (e.g., in response to the received configuration request). This request/response exchange may in some cases be an example of the exchanges described above with reference to FIG. 2. For example, the request and response may indicate a TID, a flow identifier, a frame type, a link identifier, any combination thereof, etc., associated with a given wireless link of the multi-link session.

At 420, wireless device 405-a may modify (e.g., tear down, reconfigure, etc.) one of more of the plurality of wireless links based at least in part on the request and response exchange (e.g., at 410 and 415). Wireless device 405-a may also configure a new wireless link. At 425, wireless device 405-b may similarly modify (e.g., configure or set up, tear down, reconfigure, etc.) one of more of the plurality of wireless links based at least in part on the request and response exchange (e.g., at 410 and 415). At 430, wireless device 405-a and wireless device 405-b may communicate using one or more of the modified links.

Figure 5:
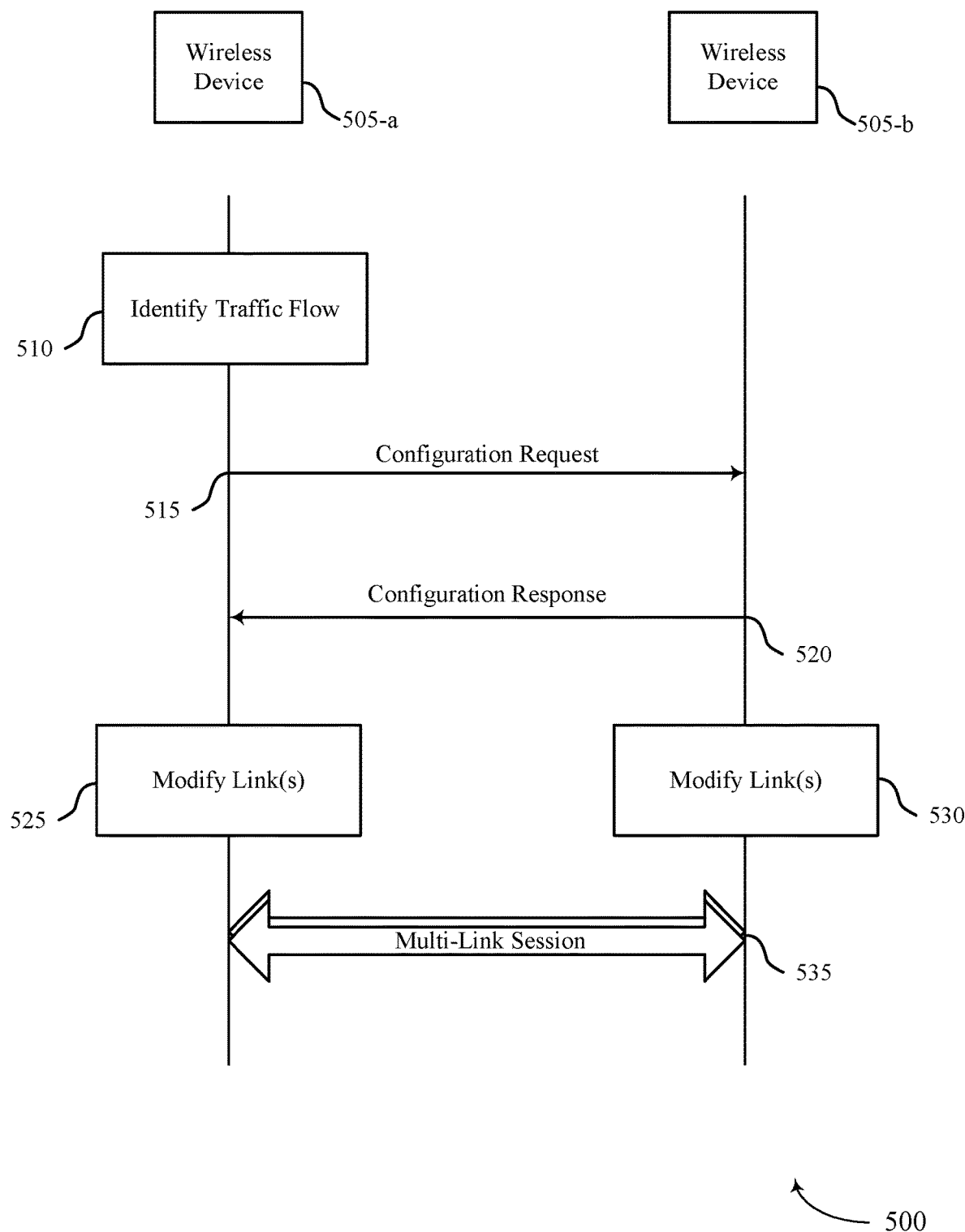

FIG. 5 illustrates a process flow 500 that supports signaling for link aggregation setup and reconfiguration in accordance with aspects of the present disclosure. Process flow 500 may implement aspects of WLAN 100. For example, process flow 500 includes wireless device 505-a and wireless device 505-b, each of which may be an example of a STA 115 or an AP 105 as described with reference to WLAN 100.

In various examples described below, each of wireless device 505-a and wireless device 505-b may be an example of either of wireless devices 305-a and 305-b as well as either of wireless devices 405-a and 405-b. For example, in some cases wireless device 505-a may be an example of wireless device 305-a (e.g., the device that initiates the exchange of the aggregation capability information with an aggregation capability request) and wireless device 505-b may be an example of wireless device 305-b. Additionally or alternatively, wireless device 505-a may be an example of wireless device 305-b, and wireless device 505-b may be an example of wireless device 305-a. Thus, multiple permutations may be realized when combining the operations of process flows 300, 400, and 500 without deviating from the scope of the present disclosure.

At 510, wireless device 505-a may identify a TID (e.g., or flow ID or link ID or frame type) associated with one or more links that are to be setup or reconfigured. Examples include broadcast flows, multicast flows, unicast flows, control frames, data frames, management frames, TIDs corresponding to a particular AC or group of ACs, or any combination thereof.

At 515, wireless device 505-a may transmit a configuration request to initiate setup or reconfiguration of one or more wireless links for the TID identified at 510. At 520, wireless device 505-b may respond with a configuration response (e.g., which may in some cases be an ACK). Accordingly, at 525, wireless device 505-a may modify (e.g., tear down, reconfigure, etc.) an existing wireless link of the one or more wireless links, or configure (e.g., set up) a new wireless link to add to the one or more wireless links. At 530, wireless device 505-b may modify (e.g., tear down, reconfigure, etc.) the one or more wireless links, and may configure a new wireless link. Wireless device 505-a and wireless device 505-b may then exchange data during the multi-link session at 535. In various examples, the configuration request transmitted at 515 may indicate the set of TIDs, flow IDs, frame types, link IDs, etc. to be aggregated. For example, the indication may be explicit (e.g., may include a set of bits indicating specific TIDs) and/or may be based on reference (e.g., using a set of bits) to a look-up table or some other pre-defined (e.g., or configurable) index set. In cases in which the configuration request includes link IDs, the link ID may include a channel number, a BSSID, a per-link TA and/or RA, or a combination thereof.

Figure 6:
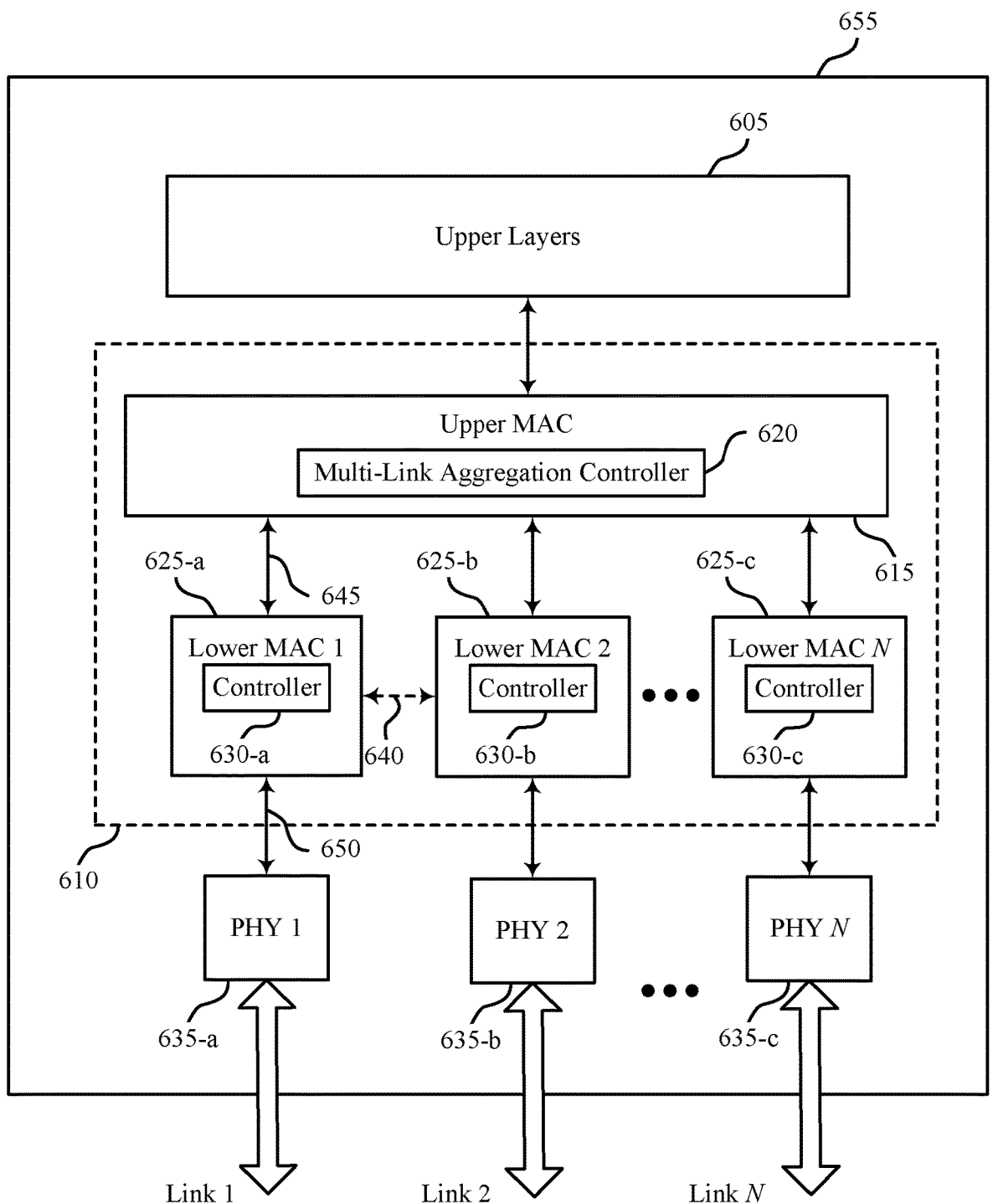
FIG. 6 illustrates an example of a layer configuration that supports signaling for link aggregation setup and reconfiguration in accordance with aspects of the present disclosure.

FIG. 6 illustrates an example layer configuration 600 that supports signaling for link aggregation setup and reconfiguration in accordance with aspects of the present disclosure. Layer configuration 600 may apply to a STA 115 or an AP 105 (including wireless device 405 or wireless device 505), and be for a transmitting wireless device or a receiving wireless device. It is to be understood that aspects of layer configuration 600 may represent logical constructs (e.g., such that components of layer configuration 600 may share hardware components). A wireless device 655 may support layer configuration 600 through the use of various hardware configurations described herein.

As illustrated, layer configuration 600 may include upper layers 605, a MAC layer 610, and one or more PHY layers 635 (e.g., where each PHY layer 635 may in some cases be associated with a respective link or channel). MAC layer 610 may be further divided into upper MAC layer 615 and lower MAC layer 625-a, lower MAC layer 625-b, and lower MAC layer 625-c. While three lower MAC layers 625 are illustrated, it is to be understood that upper MAC layer 615 may control (e.g., via multi-link aggregation controller 620) any suitable number of lower MAC layers 625. Signaling between a given lower MAC (e.g., lower MAC layer 625-a) and upper MAC layer 615 may be carried by connection 645. Similarly, signaling between lower MAC layer 625-a and PHY layer 635-a may be carried by connection 650 and signaling between lower MAC layer 625-a and lower MAC layer 625-b may be carried by connection 640. As described below, the signaling for lower MAC 625-a, lower MAC layer 625-b, and lower MAC layer 625-c may be based on logic associated with respective controller 630-a, controller 630-b, and controller 630-c.

With reference to FIG. 2, lower MAC layer 625-a may be associated, for example, with link 205-a (e.g., via PHY layer 635-a) and lower MAC layer 625-b may be associated, for example, with link 205-b (e.g., via PHY layer 635-b). That is, each link 205 may have an associated lower MAC layer 625 that performs link-specific features (e.g., channel access, UL triggered transmission procedures, multiple input, multiple output (MIMO) signaling, etc.) For example, lower MAC layer 625-a and lower MAC layer 625-b may independently perform enhanced distributed channel access (EDCA) countdowns on respective links 205-a and 205-b. Additionally or alternatively, lower MAC layers 625 may perform RTS/CTS procedures, perform clear channel assessment (CCA) procedures, apply a modulation and coding scheme (MCS), control a physical packet data unit (PPDU) duration, transmit sounding reference signals, etc.

Upper MAC layer 615 may provide a single-link interface to upper layers 605. For example, upper MAC layer 615 may perform management and security-related operations. Such a design may allow a single beacon from an AP 105 on a primary band to control multi-band STAs 115. Additionally or alternatively, the single upper MAC layer 615 may allow for a single association procedure to initiate the multi-link session. For example, an association procedure may be performed using a single link, but provide for capability information for multiple links, which may include the link that is being used for the association procedure. In some cases, the upper MAC layer 615 may provide signaling (e.g., OMI signaling) that allows for dynamic bandwidth control (e.g., expansion). The upper MAC layer 615 may additionally or alternatively provide a single BA space (e.g., a single BA scoreboard and sequence space) such that MPDUs may be scheduled dynamically on a per-PPDU basis for each link (e.g., such that a given MPDU may be retransmitted on a different link from that on which it was originally transmitted).

Figure 7:
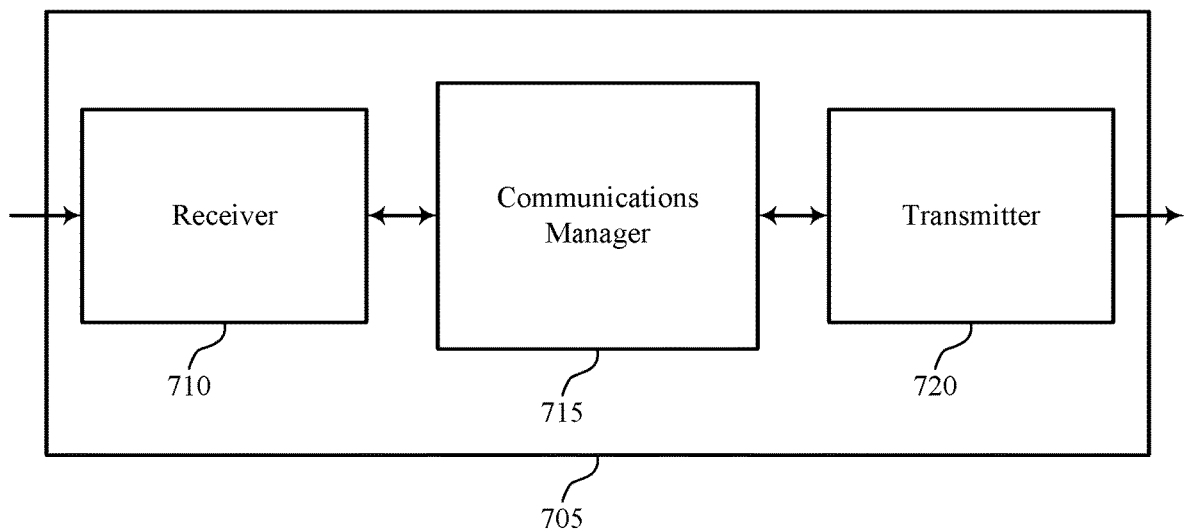
FIGS. 7 through 9 show block diagrams of a device that supports signaling for link aggregation setup and reconfiguration in accordance with aspects of the present disclosure.

FIG. 7 shows a block diagram 700 of a wireless device 705 that supports signaling for link aggregation setup and reconfiguration in accordance with aspects of the present disclosure. Wireless device 705 may be an example of aspects of a STA 115, an AP 105, or any of the wireless devices (e.g., wireless device 305) as described herein. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to signaling for link aggregation setup and reconfiguration, etc.). Information may be passed on to other components of the device. The receiver 710 may be an example of aspects of the transceiver 1035 described with reference to FIG. 10. The receiver 710 may utilize a single antenna or a set of antennas.

Communications manager 715 may be an example of aspects of the communications manager 1015 described with reference to FIG. 10. Communications manager 715 and/or at least some of its various sub-components may be implemented in hardware, software executed by a processor, firmware, or any combination thereof. If implemented in software executed by a processor, the functions of the communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 715 and/or at least some of its various sub-components may be physically located at various positions, including being distributed such that portions of functions are implemented at different physical locations by one or more physical devices. In some examples, communications manager 715 and/or at least some of its various sub-components may be a separate and distinct component in accordance with various aspects of the present disclosure. In other examples, communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 715 may identify first aggregation capability information indicating a capability of the first wireless device to communicate in parallel over a set of wireless links. Communications manager 715 may receive second aggregation capability information from the second wireless device, the second aggregation capability information indicating a capability of the second wireless device to communicate in parallel over the set of wireless links. Communications manager 715 may establish the multi-link session between the first wireless device and the second wireless device based on the identified first aggregation capability information and the received second aggregation capability information.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
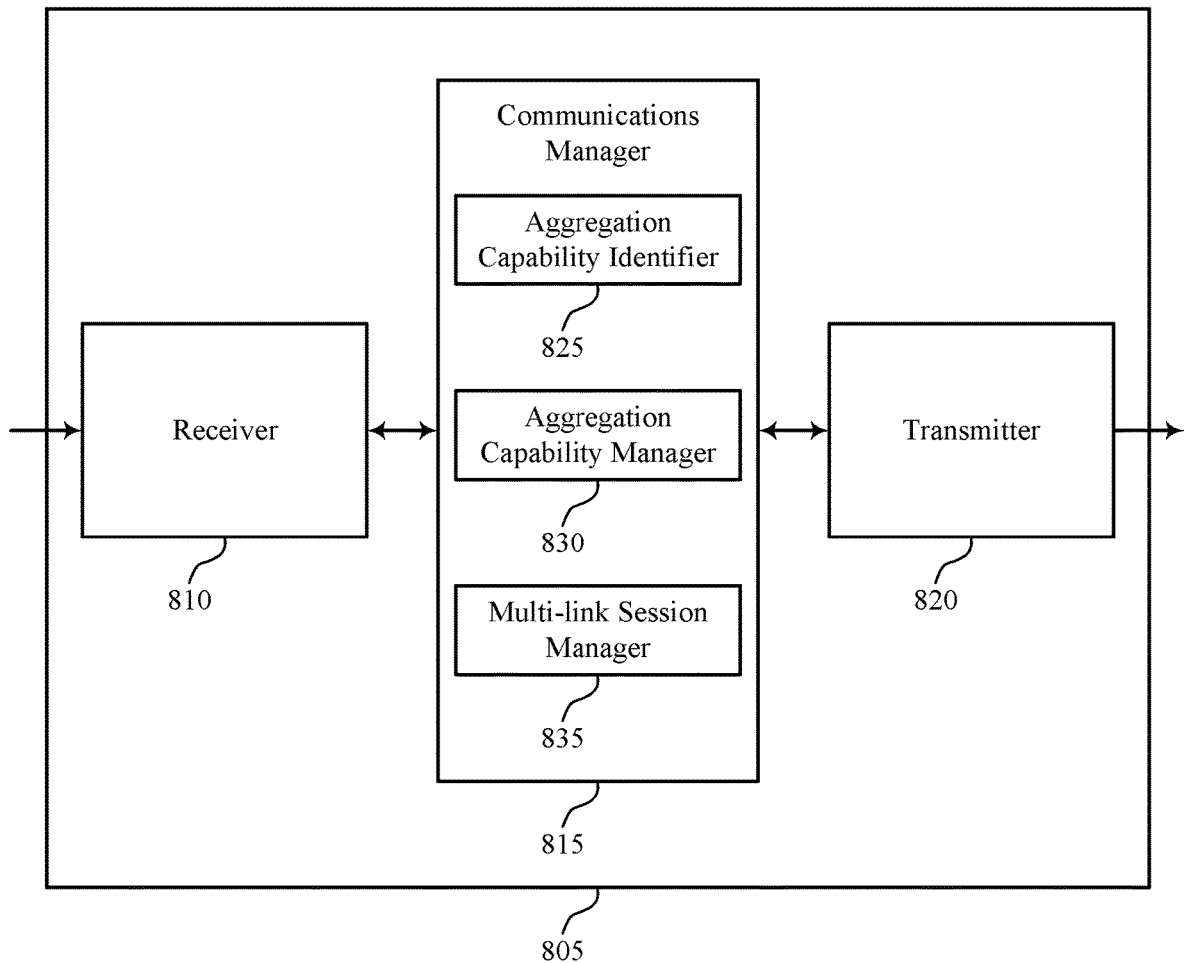

FIG. 8 shows a block diagram 800 of a wireless device 805 that supports signaling for link aggregation setup and reconfiguration in accordance with aspects of the present disclosure. Wireless device 805 may be an example of aspects of a wireless device 705 or a STA 115, an AP 105, or any of the wireless devices (e.g., wireless device 305) as described with reference to FIG. 7. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to signaling for link aggregation setup and reconfiguration, etc.). Information may be passed on to other components of the device. The receiver 810 may be an example of aspects of the transceiver 1035 described with reference to FIG. 10. The receiver 810 may utilize a single antenna or a set of antennas.

Communications manager 815 may be an example of aspects of the communications manager 1015 described with reference to FIG. 10. Communications manager 815 may also include aggregation capability identifier 825, aggregation capability manager 830, and multi-link session manager 835.

Aggregation capability identifier 825 may identify first aggregation capability information indicating a capability of the first wireless device to communicate in parallel over a set of wireless links. Aggregation capability identifier 825 may receive a request for the first aggregation capability information from the second wireless device. Aggregation capability identifier 825 may transmit, to the second wireless device in response to the received request, the first aggregation capability information of the first wireless device. Aggregation capability identifier 825 may in some cases advertise (e.g., broadcast) the first aggregation capability information of the first wireless device.

In some cases, the first aggregation capability information includes an indication of a duration for which the first wireless device is willing to communicate in parallel over the set of wireless links. In some cases, receiving the request for the first aggregation capability information includes receiving a field in a data frame, a management frame, or a control frame such as a probe request, or an association request, or a dedicated action frame, or a control field carried in a control frame, management frame, or data frame, or a combination thereof. In some cases, the second aggregation capability information is received with the received request for the first aggregation capability information. In some cases, the first aggregation capability information, or the second aggregation capability information, or both include an aggregation type, or link identification information, or a receive queue size, or a block acknowledgement bitmap size, or an indication of fragmentation support, or a combination thereof.

Aggregation capability manager 830 may receive second aggregation capability information from the second wireless device, the second aggregation capability information indicating a capability of the second wireless device to communicate in parallel over the set of wireless links. Aggregation capability manager 830 may in some cases transmit a request for the second aggregation capability information of the second wireless device, where the second aggregation capability information is received from the second wireless device based on the transmitted request. In some cases, receiving the second aggregation capability information from the second wireless device includes receiving a control frame, a data frame, or a management frame such as a beacon, or a probe response, or an association response, or a dedicated action frame, or a control field, or a control field in a data frame, or a control field in a control frame, or a control field in a management frame, or a control field in a data frame, or a combination thereof that includes the second aggregation capability information.

Multi-link session manager 835 may establish the multi-link session between the first wireless device and the second wireless device based on the identified first aggregation capability information and the received second aggregation capability information. In some cases, at least one of the set of wireless links includes a channel in a shared radio frequency spectrum band. In some cases, a first wireless link of the set of wireless links is in a first radio frequency spectrum band having a first path loss value. In some cases, a second wireless link of the set of wireless links is in a second radio frequency spectrum band having a second path loss value that is greater than the first path loss value.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
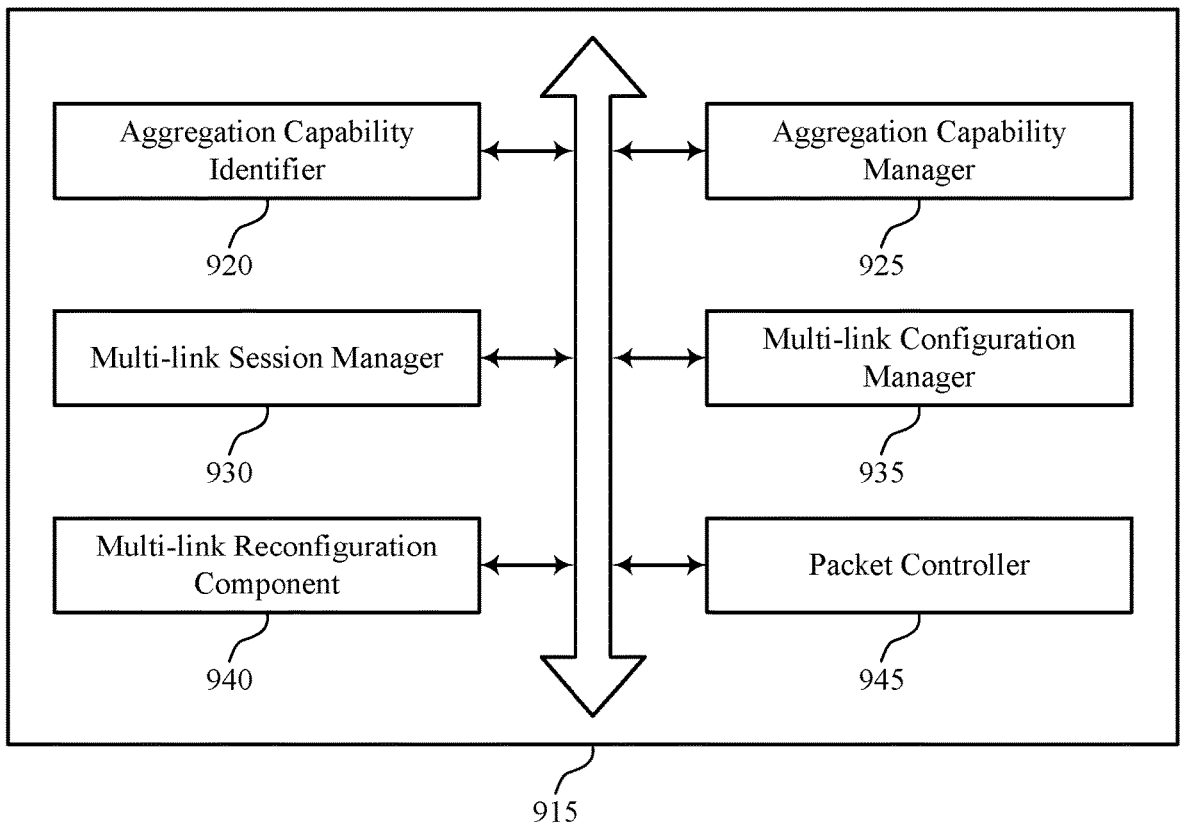

FIG. 9 shows a block diagram 900 of a communications manager 915 that supports signaling for link aggregation setup and reconfiguration in accordance with aspects of the present disclosure. The communications manager 915 may be an example of aspects of a communications manager 715, a communications manager 815, or a communications manager 1015 described with reference to FIGS. 7, 8, and 10. The communications manager 915 may include aggregation capability identifier 920, aggregation capability manager 925, multi-link session manager 930, multi-link configuration manager 935, multi-link reconfiguration component 940, and packet controller 945. Each of these modules may communicate, directly or indirectly, with one another (e.g., via one or more buses).

Aggregation capability identifier 920 may identify first aggregation capability information indicating a capability of the first wireless device to communicate in parallel over a set of wireless links. In some cases, aggregation capability identifier 920 may receive a request for the first aggregation capability information from the second wireless device. Aggregation capability identifier 920 may transmit, to the second wireless device in response to the received request, the first aggregation capability information of the first wireless device. Aggregation capability identifier 920 may advertise the first aggregation capability information of the first wireless device. In some cases, the first aggregation capability information includes an indication of a duration for which the first wireless device is willing to communicate in parallel over the set of wireless links. In some cases, receiving the request for the first aggregation capability information includes receiving a field in a data frame, a management frame, or a control frame such as a probe request, or an association request, or a dedicated action frame, or a control field carried in a control frame, or a control field in a management frame, or a control field in a control frame, or a combination thereof. In some cases, the second aggregation capability information is received with the received request for the first aggregation capability information. In some cases, the first aggregation capability information, or the second aggregation capability information, or both include an aggregation type, or link identification information, or a receive queue size, or a block acknowledgement bitmap size, or an indication of fragmentation support, or a combination thereof.

Aggregation capability manager 925 may receive second aggregation capability information from the second wireless device, the second aggregation capability information indicating a capability of the second wireless device to communicate in parallel over the set of wireless links. Aggregation capability manager 925 may transmit a request for the second aggregation capability information of the second wireless device, where the second aggregation capability information is received from the second wireless device based on the transmitted request. In some cases, receiving the second aggregation capability information from the second wireless device includes receiving a control frame, a data frame, or a management frame such as a beacon, or a probe response, or an association response, or a dedicated action frame, or a control field, or a control field in a data frame, or a control field in a management frame, or a combination thereof that includes the second aggregation capability information.

Multi-link session manager 930 may establish the multi-link session between the first wireless device and the second wireless device based on the identified first aggregation capability information and the received second aggregation capability information. In some cases, at least one of the set of wireless links includes a channel in a shared radio frequency spectrum band. In some cases, a first wireless link of the set of wireless links is in a first radio frequency spectrum band having a first path loss value. In some cases, a second wireless link of the set of wireless links is in a second radio frequency spectrum band having a second path loss value that is greater than the first path loss value.

Multi-link configuration manager 935 may transmit a request for configuration information of the second wireless device for the multi-link session. Multi-link configuration manager 935 may receive the configuration information from the second wireless device in response to the transmitted request. Multi-link configuration manager 935 may receive, from the second wireless device, a request for configuration information of the first wireless device for the multi-link session. Multi-link configuration manager 935 may transmit the configuration information of the first wireless device to the second wireless device in response to the received request. Multi-link configuration manager 935 may modify one or more of the set of wireless links based on the configuration information of the first wireless device and configuration information received from the second wireless device for the multi-link session.

Multi-link reconfiguration component 940 may transmit a reconfiguration request for the multi-link session to the second wireless device. Multi-link reconfiguration component 940 may receive, from the second wireless device, a response to the reconfiguration request including an indication of at least one reconfigured wireless link of the set of wireless links. Multi-link reconfiguration component 940 may communicate with the second wireless device based on the received response to the reconfiguration request. In some cases, the reconfiguration request includes a traffic identifier, or a flow identifier, or a frame type, or a combination thereof associated with a wireless link of the set of wireless links. In some cases, the reconfiguration request further includes a link identifier associated with the wireless link.

Packet controller 945 may transmit a first set of packets to the second wireless device via a first wireless link of the set of wireless links, the first set of packets associated with a first traffic identifier. Packet controller 945 may transmit a second set of packets to the second wireless device via a second wireless link of the set of wireless links, the second set of packets associated with the first traffic identifier. Packet controller 945 may transmit a second set of packets to the second wireless device via a second wireless link of the set of wireless links, the second set of packets associated with a second traffic identifier. Packet controller 945 may identify a transmission type for a set of packets to be transmitted to the second wireless device, the transmission type including broadcast, multicast, or unicast. Packet controller 945 may transmit the set of packets over a first wireless link of the set of wireless links based on identifying the transmission type for the set of packets as broadcast, or multicast, or a combination thereof. Packet controller 945 may transmit the set of packets over a second wireless link of the set of wireless links based on identifying the transmission type for the set of packets as unicast. Packet controller 945 may identify a frame type for a set of packets to be transmitted to the second wireless device, the frame type including data, control, or management. Packet controller 945 may transmit the set of packets over a first wireless link of the set of wireless links based on identifying the frame type for the set of packets as data or transmit the set of packets over a second wireless link of the set of wireless links based on identifying the frame type for the set of packets as control, or management, or a combination thereof.

Figure 10:
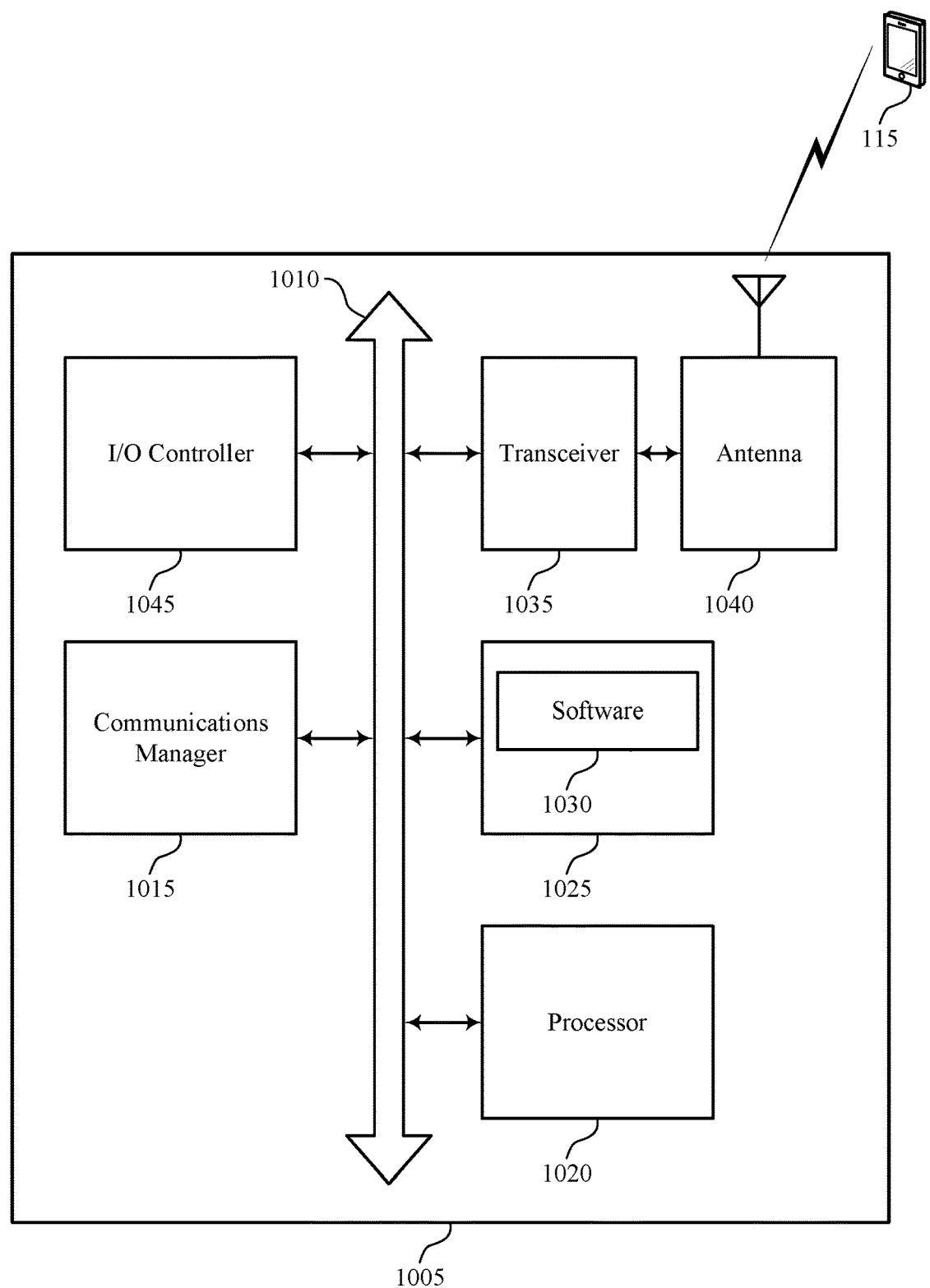
FIG. 10 illustrates a block diagram of a system including a wireless device that supports signaling for link aggregation setup and reconfiguration in accordance with aspects of the present disclosure.

FIG. 10 shows a diagram of a system 1000 including a device 1005 that supports signaling for link aggregation setup and reconfiguration in accordance with aspects of the present disclosure. Device 1005 may be an example of or include the components of wireless device 705, wireless device 805, or a STA 115, an AP 105, or any of the wireless devices (e.g., wireless device 305) as described above, e.g., with reference to FIGS. 7 and 8. Device 1005 may include components for bi-directional voice and data communications including components for transmitting and receiving communications, including communications manager 1015, processor 1020, memory 1025, software 1030, transceiver 1035, antenna 1040, and I/O controller 1045. These components may be in electronic communication via one or more buses (e.g., bus 1010).

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting signaling for link aggregation setup and reconfiguration).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support signaling for link aggregation setup and reconfiguration. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas. In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
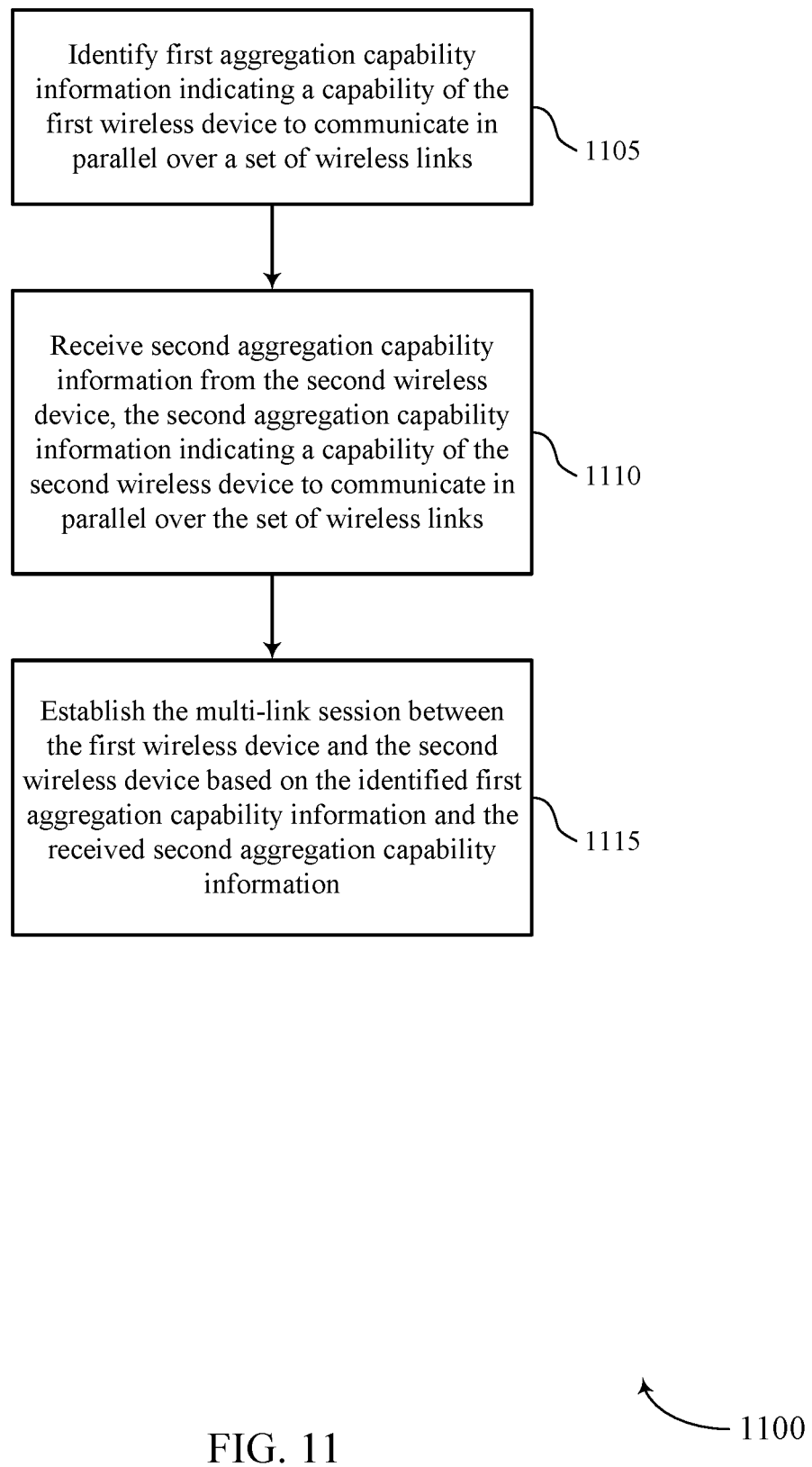
FIGS. 11 through 20 illustrate methods for signaling for link aggregation setup and reconfiguration in accordance with aspects of the present disclosure.

FIG. 11 shows a flowchart illustrating a method 1100 for signaling for link aggregation setup and reconfiguration in accordance with aspects of the present disclosure. The operations of method 1100 may be implemented by a STA 115, an AP 105, or any of the wireless devices (e.g., wireless device 305) or its components as described herein. For example, the operations of method 1100 may be performed by a communications manager as described with reference to FIGS. 7 through 10. In some examples, a STA 115 or an AP 105 may execute a set of codes to control the functional elements of the device to perform the functions described below. Additionally or alternatively, the STA 115 or AP 105 may perform aspects of the functions described below using special-purpose hardware.

At 1105 the wireless device may identify first aggregation capability information indicating a capability of the first wireless device to communicate in parallel over a plurality of wireless links. The operations of 1105 may be performed according to the methods described herein. In certain examples, aspects of the operations of 1105 may be performed by an aggregation capability identifier as described with reference to FIGS. 7 through 10.

At 1110 the wireless device may receive second aggregation capability information from the second wireless device, the second aggregation capability information indicating a capability of the second wireless device to communicate in parallel over the plurality of wireless links. The operations of 1110 may be performed according to the methods described herein. In certain examples, aspects of the operations of 1110 may be performed by an aggregation capability manager as described with reference to FIGS. 7 through 10.

At 1115 the wireless device may establish the multi-link session between the first wireless device and the second wireless device based at least in part on the identified first aggregation capability information and the received second aggregation capability information. The operations of 1115 may be performed according to the methods described herein. In certain examples, aspects of the operations of 1115 may be performed by a multi-link session manager as described with reference to FIGS. 7 through 10.

Figure 12:
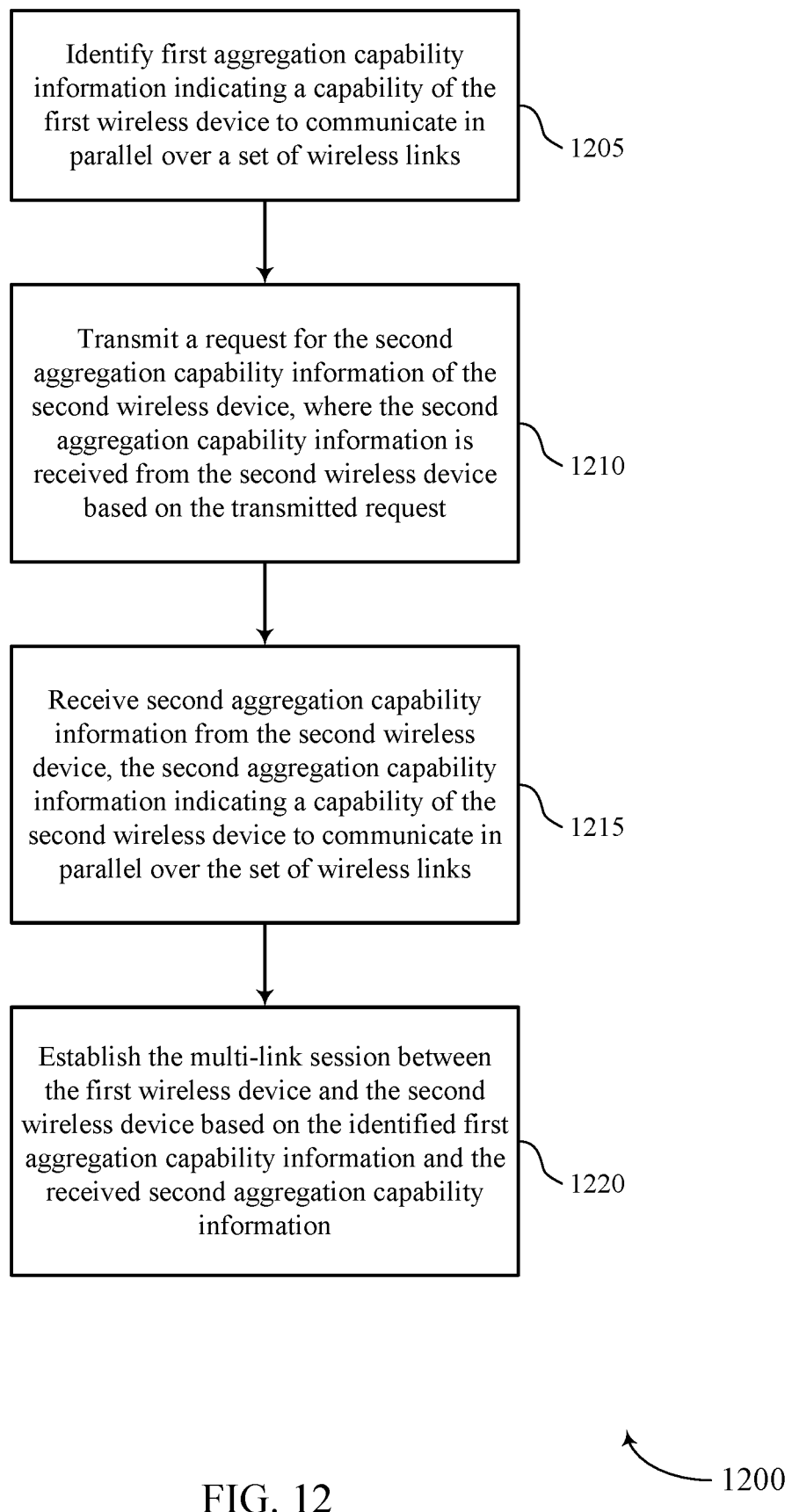

FIG. 12 shows a flowchart illustrating a method 1200 for signaling for link aggregation setup and reconfiguration in accordance with aspects of the present disclosure. The operations of method 1200 may be implemented by a STA 115, an AP 105, or any of the wireless devices (e.g., wireless device 305) or its components as described herein. For example, the operations of method 1200 may be performed by a communications manager as described with reference to FIGS. 7 through 10. In some examples, a wireless device may execute a set of codes to control the functional elements of the device to perform the functions described below. Additionally or alternatively, the wireless device may perform aspects of the functions described below using special-purpose hardware.

At 1205 the wireless device may identify first aggregation capability information indicating a capability of the first wireless device to communicate in parallel over a plurality of wireless links. The operations of 1205 may be performed according to the methods described herein. In certain examples, aspects of the operations of 1205 may be performed by an aggregation capability identifier as described with reference to FIGS. 7 through 10.

At 1210 the wireless device may transmit a request for the second aggregation capability information of the second wireless device, wherein the second aggregation capability information is received from the second wireless device based at least in part on the transmitted request. The operations of 1210 may be performed according to the methods described herein. In certain examples, aspects of the operations of 1210 may be performed by an aggregation capability manager as described with reference to FIGS. 7 through 10.

At 1215 the wireless device may receive second aggregation capability information from the second wireless device, the second aggregation capability information indicating a capability of the second wireless device to communicate in parallel over the plurality of wireless links. The operations of 1215 may be performed according to the methods described herein. In certain examples, aspects of the operations of 1215 may be performed by an aggregation capability manager as described with reference to FIGS. 7 through 10.

At 1220 the wireless device may establish the multi-link session between the first wireless device and the second wireless device based at least in part on the identified first aggregation capability information and the received second aggregation capability information. The operations of 1220 may be performed according to the methods described herein. In certain examples, aspects of the operations of 1220 may be performed by a multi-link session manager as described with reference to FIGS. 7 through 10.

Figure 13:
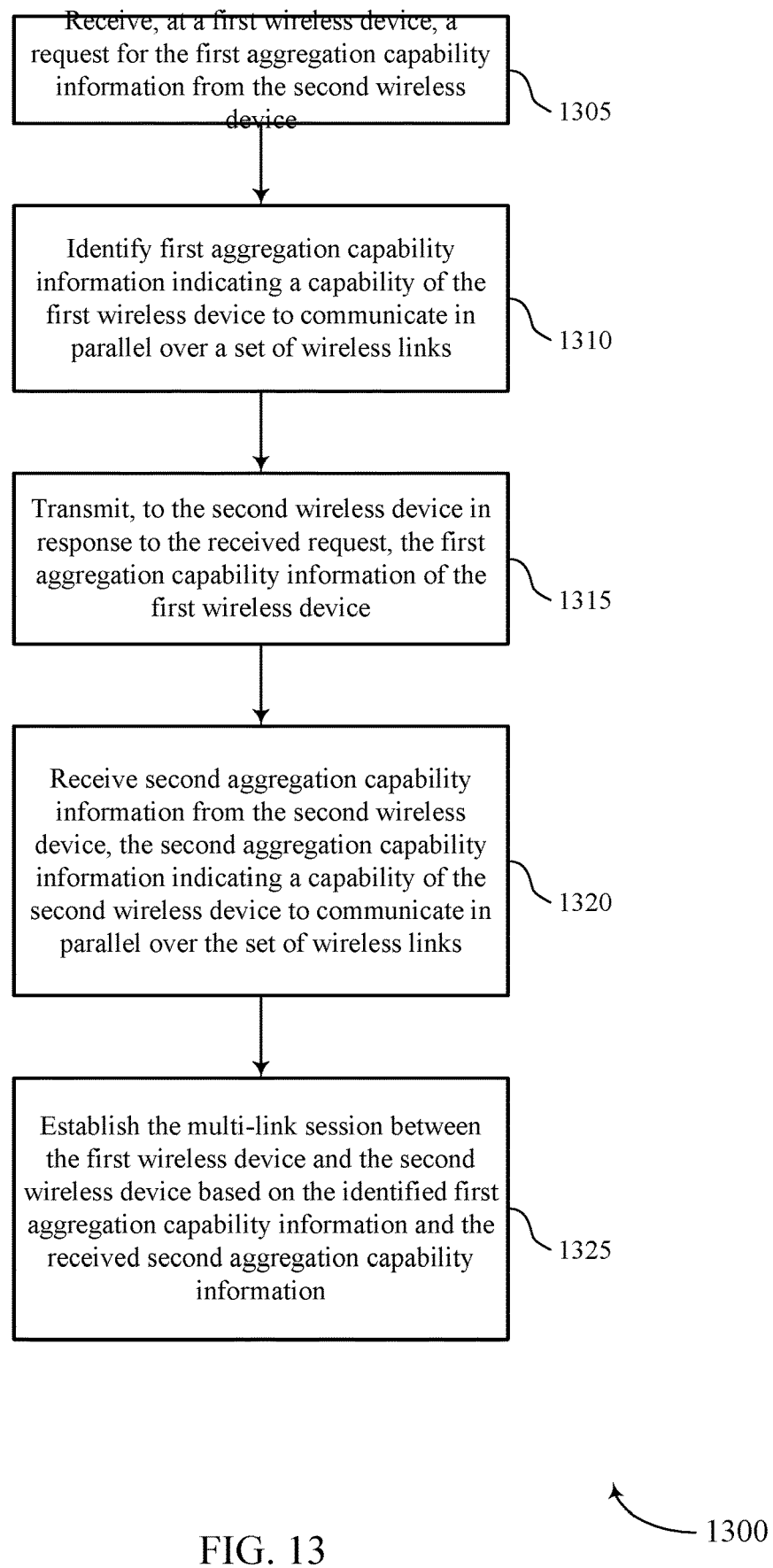

FIG. 13 shows a flowchart illustrating a method 1300 for signaling for link aggregation setup and reconfiguration in accordance with aspects of the present disclosure. The operations of method 1300 may be implemented by a STA 115, an AP 105, or any of the wireless devices (e.g., wireless device 305) or its components as described herein. For example, the operations of method 1300 may be performed by a communications manager as described with reference to FIGS. 7 through 10. In some examples, a wireless device may execute a set of codes to control the functional elements of the device to perform the functions described below. Additionally or alternatively, the wireless device may perform aspects of the functions described below using special-purpose hardware.

At 1305 the wireless device may receive a request for the first aggregation capability information from the second wireless device. In some cases, receiving the request for the first aggregation capability information includes receiving a field in a data frame, a management frame, or a control frame such as a probe request, or an association request, or a dedicated action frame, or a control field carried in a control frame, or a control field carried in a data frame, or a control field carried in a management frame, or a combination thereof. The operations of 1305 may be performed according to the methods described herein. In certain examples, aspects of the operations of 1305 may be performed by an aggregation capability identifier as described with reference to FIGS. 7 through 10.

At 1310 the wireless device may identify first aggregation capability information indicating a capability of the first wireless device to communicate in parallel over a plurality of wireless links. The first aggregation capability information may include an indication of a duration of time for which the first wireless device is willing to communicate in parallel over the plurality of wireless links. The operations of 1310 may be performed according to the methods described herein. In certain examples, aspects of the operations of 1310 may be performed by an aggregation capability identifier as described with reference to FIGS. 7 through 10.

At 1315 the wireless device may transmit, to the second wireless device in response to the received request, the first aggregation capability information of the first wireless device. The operations of 1315 may be performed according to the methods described herein. In certain examples, aspects of the operations of 1315 may be performed by an aggregation capability identifier as described with reference to FIGS. 7 through 10.

At 1320 the wireless device may receive second aggregation capability information from the second wireless device, the second aggregation capability information indicating a capability of the second wireless device to communicate in parallel over the plurality of wireless links. In some cases, receiving the second aggregation capability information includes receiving a control frame, a data frame, or a management frame such as a beacon, or a probe response, or an association response, or a dedicated action frame, or a control field, or a control field in a data frame, or a control field in a management frame, or a combination thereof. In some cases, the second aggregation capability information is received with the received request for the first aggregation capability information. The operations of 1320 may be performed according to the methods described herein. In certain examples, aspects of the operations of 1320 may be performed by an aggregation capability manager as described with reference to FIGS. 7 through 10.

At 1325 the wireless device may establish the multi-link session between the first wireless device and the second wireless device based at least in part on the identified first aggregation capability information and the received second aggregation capability information. The operations of 1325 may be performed according to the methods described herein. In certain examples, aspects of the operations of 1325 may be performed by a multi-link session manager as described with reference to FIGS. 7 through 10.

Figure 14:
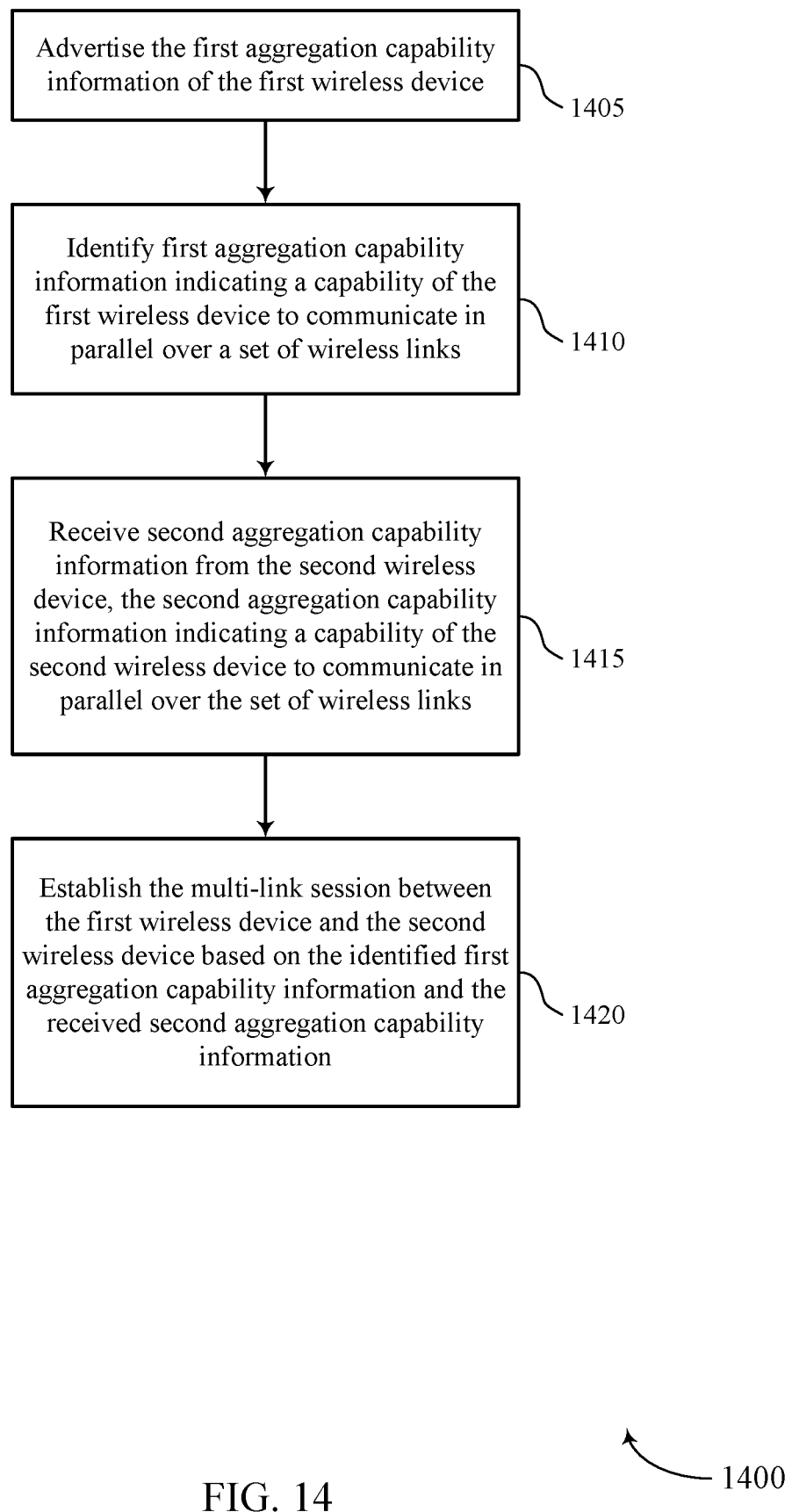

FIG. 14 shows a flowchart illustrating a method 1400 for signaling for link aggregation setup and reconfiguration in accordance with aspects of the present disclosure. The operations of method 1400 may be implemented by a STA 115, an AP 105, or any of the wireless devices (e.g., wireless device 305) or its components as described herein. For example, the operations of method 1400 may be performed by a communications manager as described with reference to FIGS. 7 through 10. In some examples, a wireless device may execute a set of codes to control the functional elements of the device to perform the functions described below. Additionally or alternatively, the wireless device may perform aspects of the functions described below using special-purpose hardware.

At 1405 the wireless device may advertise (e.g., broadcast) the first aggregation capability information of the first wireless device. The operations of 1405 may be performed according to the methods described herein. In certain examples, aspects of the operations of 1405 may be performed by an aggregation capability identifier as described with reference to FIGS. 7 through 10.

At 1410 the wireless device may identify first aggregation capability information indicating a capability of the first wireless device to communicate in parallel over a plurality of wireless links. The operations of 1410 may be performed according to the methods described herein. In certain examples, aspects of the operations of 1410 may be performed by an aggregation capability identifier as described with reference to FIGS. 7 through 10.

At 1415 the wireless device may receive second aggregation capability information from the second wireless device, the second aggregation capability information indicating a capability of the second wireless device to communicate in parallel over the plurality of wireless links. The operations of 1415 may be performed according to the methods described herein. In certain examples, aspects of the operations of 1415 may be performed by an aggregation capability manager as described with reference to FIGS. 7 through 10.

At 1420 the wireless device may establish the multi-link session between the first wireless device and the second wireless device based at least in part on the identified first aggregation capability information and the received second aggregation capability information. The operations of 1420 may be performed according to the methods described herein. In certain examples, aspects of the operations of 1420 may be performed by a multi-link session manager as described with reference to FIGS. 7 through 10.

Figure 15:
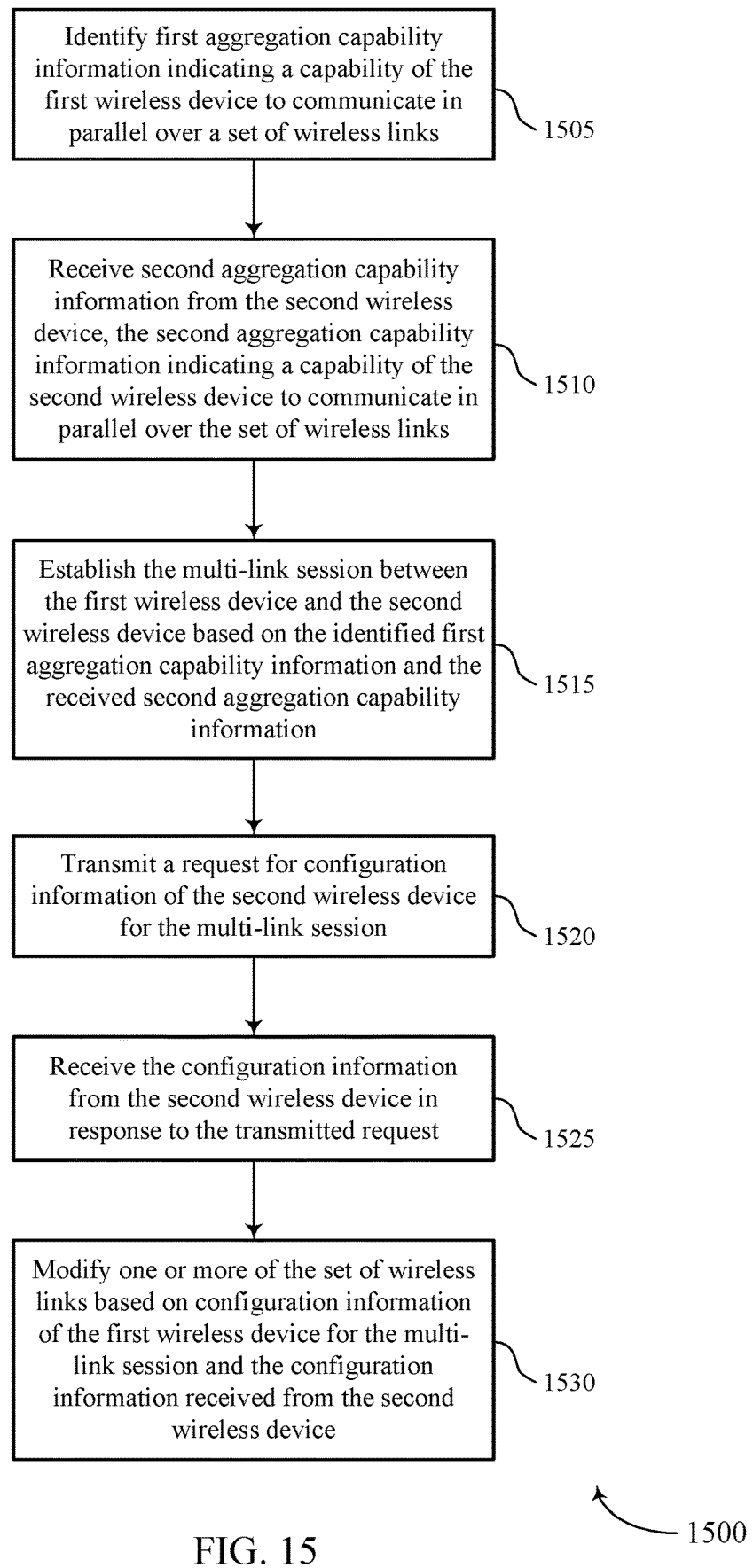

FIG. 15 shows a flowchart illustrating a method 1500 for signaling for link aggregation setup and reconfiguration in accordance with aspects of the present disclosure. The operations of method 1500 may be implemented by a STA 115, an AP 105, or any of the wireless devices (e.g., wireless device 305) or its components as described herein. For example, the operations of method 1500 may be performed by a communications manager as described with reference to FIGS. 7 through 10. In some examples, a wireless device may execute a set of codes to control the functional elements of the device to perform the functions described below.

Additionally or alternatively, the wireless device may perform aspects of the functions described below using special-purpose hardware.

At 1505 the wireless device may identify first aggregation capability information indicating a capability of the first wireless device to communicate in parallel over a plurality of wireless links. The operations of 1505 may be performed according to the methods described herein. In certain examples, aspects of the operations of 1505 may be performed by an aggregation capability identifier as described with reference to FIGS. 7 through 10.

At 1510 the wireless device may receive second aggregation capability information from the second wireless device, the second aggregation capability information indicating a capability of the second wireless device to communicate in parallel over the plurality of wireless links. The operations of 1510 may be performed according to the methods described herein. In certain examples, aspects of the operations of 1510 may be performed by an aggregation capability manager as described with reference to FIGS. 7 through 10.

At 1515 the wireless device may establish the multi-link session between the first wireless device and the second wireless device based at least in part on the identified first aggregation capability information and the received second aggregation capability information. The operations of 1515 may be performed according to the methods described herein. In certain examples, aspects of the operations of 1515 may be performed by a multi-link session manager as described with reference to FIGS. 7 through 10.

At 1520 the wireless device may transmit a request for configuration information of the second wireless device for the multi-link session. The operations of 1520 may be performed according to the methods described herein. In certain examples, aspects of the operations of 1520 may be performed by a multi-link configuration manager as described with reference to FIGS. 7 through 10.

At 1525 the wireless device may receive the configuration information from the second wireless device in response to the transmitted request. The operations of 1525 may be performed according to the methods described herein. In certain examples, aspects of the operations of 1525 may be performed by a multi-link configuration manager as described with reference to FIGS. 7 through 10.

At 1530 the wireless device may modify one or more of the plurality of wireless links based at least in part on configuration information of the first wireless device for the multi-link session and the configuration information received from the second wireless device. The operations of 1530 may be performed according to the methods described herein. In certain examples, aspects of the operations of 1530 may be performed by a multi-link configuration manager as described with reference to FIGS. 7 through 10.

Figure 16:
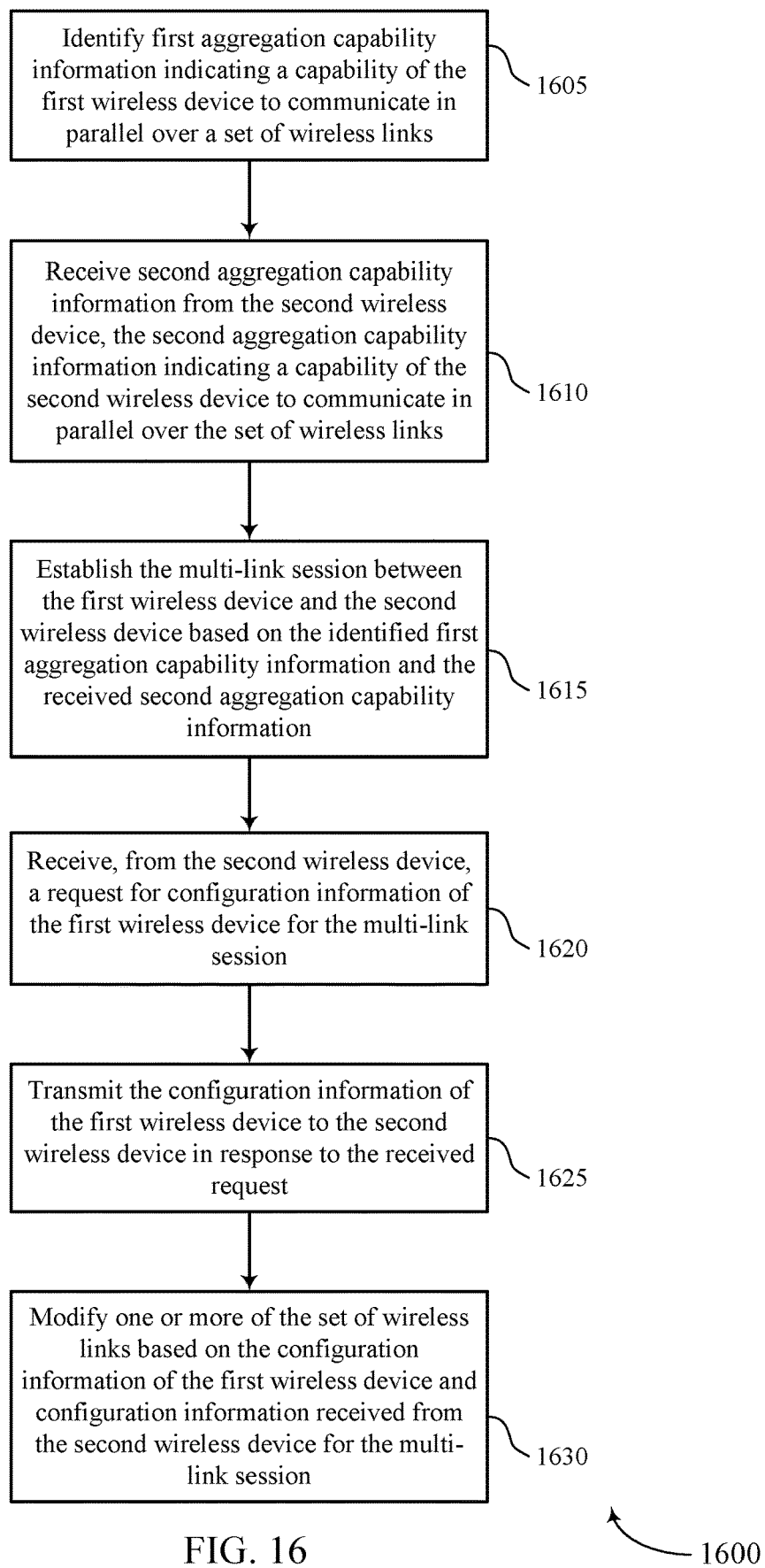

FIG. 16 shows a flowchart illustrating a method 1600 for signaling for link aggregation setup and reconfiguration in accordance with aspects of the present disclosure. The operations of method 1600 may be implemented by a STA 115, an AP 105, or any of the wireless devices (e.g., wireless device 305) or its components as described herein. For example, the operations of method 1600 may be performed by a communications manager as described with reference to FIGS. 7 through 10. In some examples, a wireless device may execute a set of codes to control the functional elements of the device to perform the functions described below. Additionally or alternatively, the wireless device may perform aspects of the functions described below using special-purpose hardware.

At 1605 the wireless device may identify first aggregation capability information indicating a capability of the first wireless device to communicate in parallel over a plurality of wireless links. The operations of 1605 may be performed according to the methods described herein. In certain examples, aspects of the operations of 1605 may be performed by an aggregation capability identifier as described with reference to FIGS. 7 through 10.

At 1610 the wireless device may receive second aggregation capability information from the second wireless device, the second aggregation capability information indicating a capability of the second wireless device to communicate in parallel over the plurality of wireless links. The operations of 1610 may be performed according to the methods described herein. In certain examples, aspects of the operations of 1610 may be performed by an aggregation capability manager as described with reference to FIGS. 7 through 10.

At 1615 the wireless device may establish the multi-link session between the first wireless device and the second wireless device based at least in part on the identified first aggregation capability information and the received second aggregation capability information. The operations of 1615 may be performed according to the methods described herein. In certain examples, aspects of the operations of 1615 may be performed by a multi-link session manager as described with reference to FIGS. 7 through 10.

At 1620 the wireless device may receive, from the second wireless device, a request for configuration information of the first wireless device for the multi-link session. The operations of 1620 may be performed according to the methods described herein. In certain examples, aspects of the operations of 1620 may be performed by a multi-link configuration manager as described with reference to FIGS. 7 through 10.

At 1625 the wireless device may transmit the configuration information of the first wireless device to the second wireless device in response to the received request. The operations of 1625 may be performed according to the methods described herein. In certain examples, aspects of the operations of 1625 may be performed by a multi-link configuration manager as described with reference to FIGS. 7 through 10.

At 1630 the wireless device may modify one or more of the plurality of wireless links based at least in part on the configuration information of the first wireless device and configuration information received from the second wireless device for the multi-link session. The operations of 1630 may be performed according to the methods described herein. In certain examples, aspects of the operations of 1630 may be performed by a multi-link configuration manager as described with reference to FIGS. 7 through 10.

Figure 17:
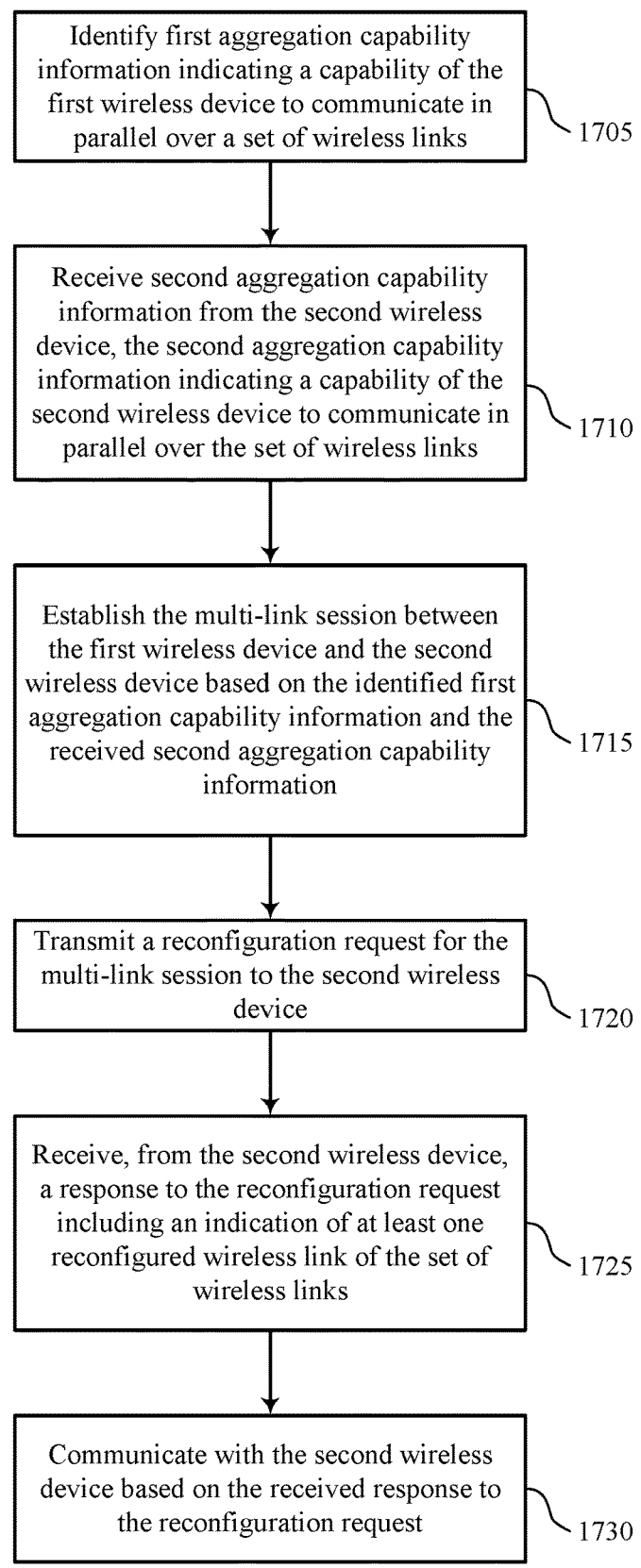

FIG. 17 shows a flowchart illustrating a method 1700 for signaling for link aggregation setup and reconfiguration in accordance with aspects of the present disclosure. The operations of method 1700 may be implemented by a STA 115, an AP 105, or any of the wireless devices (e.g., wireless device 305) or its components as described herein. For example, the operations of method 1700 may be performed by a communications manager as described with reference to FIGS. 7 through 10. In some examples, a wireless device may execute a set of codes to control the functional elements of the device to perform the functions described below. Additionally or alternatively, the wireless device may perform aspects of the functions described below using special-purpose hardware.

At 1705 the wireless device may identify first aggregation capability information indicating a capability of the first wireless device to communicate in parallel over a plurality of wireless links. The operations of 1705 may be performed according to the methods described herein. In certain examples, aspects of the operations of 1705 may be performed by an aggregation capability identifier as described with reference to FIGS. 7 through 10.

At 1710 the wireless device may receive second aggregation capability information from the second wireless device, the second aggregation capability information indicating a capability of the second wireless device to communicate in parallel over the plurality of wireless links. The operations of 1710 may be performed according to the methods described herein. In certain examples, aspects of the operations of 1710 may be performed by an aggregation capability manager as described with reference to FIGS. 7 through 10.

At 1715 the wireless device may establish the multi-link session between the first wireless device and the second wireless device based at least in part on the identified first aggregation capability information and the received second aggregation capability information. The operations of 1715 may be performed according to the methods described herein. In certain examples, aspects of the operations of 1715 may be performed by a multi-link session manager as described with reference to FIGS. 7 through 10.

At 1720 the wireless device may transmit a reconfiguration request for the multi-link session to the second wireless device. In some cases, the reconfiguration request includes a TID, or a flow identifier, or a frame type, or a combination thereof associated with a wireless link of the plurality of wireless links. In some cases, the reconfiguration request further comprises a link identifier associated with the wireless link. The operations of 1720 may be performed according to the methods described herein. In certain examples, aspects of the operations of 1720 may be performed by a multi-link reconfiguration component as described with reference to FIGS. 7 through 10.

At 1725 the wireless device may receive, from the second wireless device, a response to the reconfiguration request comprising an indication of at least one reconfigured wireless link of the plurality of wireless links. The operations of 1725 may be performed according to the methods described herein. In certain examples, aspects of the operations of 1725 may be performed by a multi-link reconfiguration component as described with reference to FIGS. 7 through 10.

At 1730 the wireless device may communicate with the second wireless device based at least in part on the received response to the reconfiguration request. The operations of 1730 may be performed according to the methods described herein. In certain examples, aspects of the operations of 1730 may be performed by a multi-link reconfiguration component as described with reference to FIGS. 7 through 10.

Figure 18:
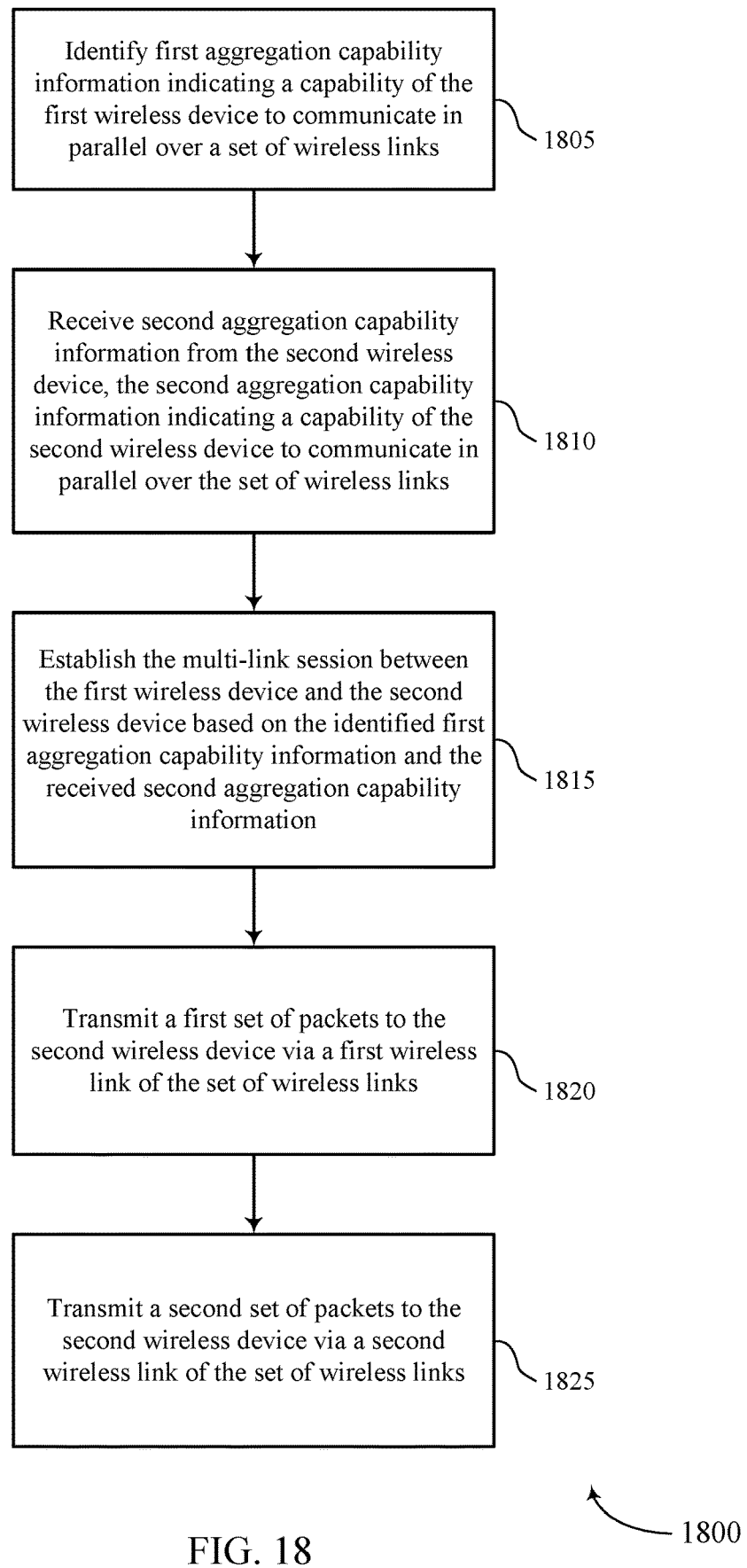

FIG. 18 shows a flowchart illustrating a method 1800 for signaling for link aggregation setup and reconfiguration in accordance with aspects of the present disclosure. The operations of method 1800 may be implemented by a STA 115, an AP 105, or any of the wireless devices (e.g., wireless device 305) or its components as described herein. For example, the operations of method 1800 may be performed by a communications manager as described with reference to FIGS. 7 through 10. In some examples, a wireless device may execute a set of codes to control the functional elements of the device to perform the functions described below. Additionally or alternatively, the wireless device may perform aspects of the functions described below using special-purpose hardware.

At 1805 the wireless device may identify first aggregation capability information indicating a capability of the first wireless device to communicate in parallel over a plurality of wireless links. The operations of 1805 may be performed according to the methods described herein. In certain examples, aspects of the operations of 1805 may be performed by an aggregation capability identifier as described with reference to FIGS. 7 through 10.

At 1810 the wireless device may receive second aggregation capability information from the second wireless device, the second aggregation capability information indicating a capability of the second wireless device to communicate in parallel over the plurality of wireless links. The operations of 1810 may be performed according to the methods described herein. In certain examples, aspects of the operations of 1810 may be performed by an aggregation capability manager as described with reference to FIGS. 7 through 10.

At 1815 the wireless device may establish the multi-link session between the first wireless device and the second wireless device based at least in part on the identified first aggregation capability information and the received second aggregation capability information. The operations of 1815 may be performed according to the methods described herein. In certain examples, aspects of the operations of 1815 may be performed by a multi-link session manager as described with reference to FIGS. 7 through 10.

At 1820 the wireless device may transmit a first set of packets to the second wireless device via a first wireless link of the plurality of wireless links, the first set of packets associated with a first traffic identifier. The operations of 1820 may be performed according to the methods described herein. In certain examples, aspects of the operations of 1820 may be performed by a packet controller as described with reference to FIGS. 7 through 10.

At 1825 the wireless device may transmit a second set of packets to the second wireless device via a second wireless link of the plurality of wireless links. In some cases, the second set of packets may be associated with the first traffic identifier. Alternatively, the second set of packets may be associated with a second traffic identifier. The operations of 1825 may be performed according to the methods described herein. In certain examples, aspects of the operations of 1825 may be performed by a packet controller as described with reference to FIGS. 7 through 10.

Figure 19:
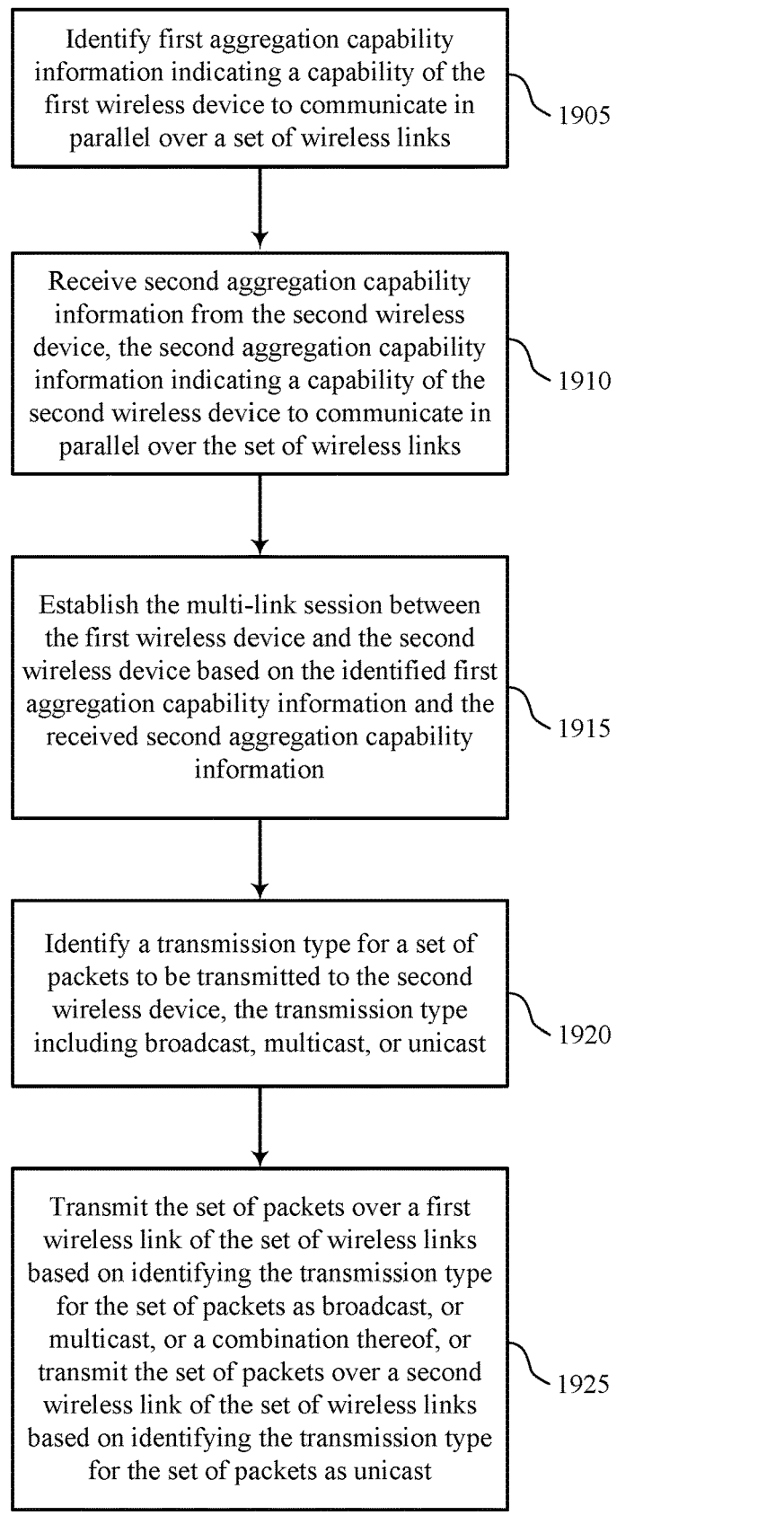

FIG. 19 shows a flowchart illustrating a method 1900 for signaling for link aggregation setup and reconfiguration in accordance with aspects of the present disclosure. The operations of method 1900 may be implemented by a STA 115, an AP 105, or any of the wireless devices (e.g., wireless device 305) or its components as described herein. For example, the operations of method 1900 may be performed by a communications manager as described with reference to FIGS. 7 through 10. In some examples, a wireless device may execute a set of codes to control the functional elements of the device to perform the functions described below. Additionally or alternatively, the wireless device may perform aspects of the functions described below using special-purpose hardware.

At 1905 the wireless device may identify first aggregation capability information indicating a capability of the first wireless device to communicate in parallel over a plurality of wireless links. The operations of 1905 may be performed according to the methods described herein. In certain examples, aspects of the operations of 1905 may be performed by a aggregation capability identifier as described with reference to FIGS. 7 through 10.

At 1910 the wireless device may receive second aggregation capability information from the second wireless device, the second aggregation capability information indicating a capability of the second wireless device to communicate in parallel over the plurality of wireless links. The operations of 1910 may be performed according to the methods described herein. In certain examples, aspects of the operations of 1910 may be performed by a aggregation capability manager as described with reference to FIGS. 7 through 10.

At 1915 the wireless device may establish the multi-link session between the first wireless device and the second wireless device based at least in part on the identified first aggregation capability information and the received second aggregation capability information. The operations of 1915 may be performed according to the methods described herein. In certain examples, aspects of the operations of 1915 may be performed by a multi-link session manager as described with reference to FIGS. 7 through 10.

At 1920 the wireless device may identify a transmission type for a set of packets to be transmitted to the second wireless device, the transmission type comprising broadcast, multicast, or unicast. The operations of 1920 may be performed according to the methods described herein. In certain examples, aspects of the operations of 1920 may be performed by a packet controller as described with reference to FIGS. 7 through 10.

At 1925 the wireless device may transmit the set of packets over a first wireless link of the plurality of wireless links based at least in part on identifying the transmission type for the set of packets as broadcast, or multicast, or a combination thereof, or transmit the set of packets over a second wireless link of the plurality of wireless links based at least in part on identifying the transmission type for the set of packets as unicast. The operations of 1925 may be performed according to the methods described herein. In certain examples, aspects of the operations of 1925 may be performed by a packet controller as described with reference to FIGS. 7 through 10.

Figure 20:
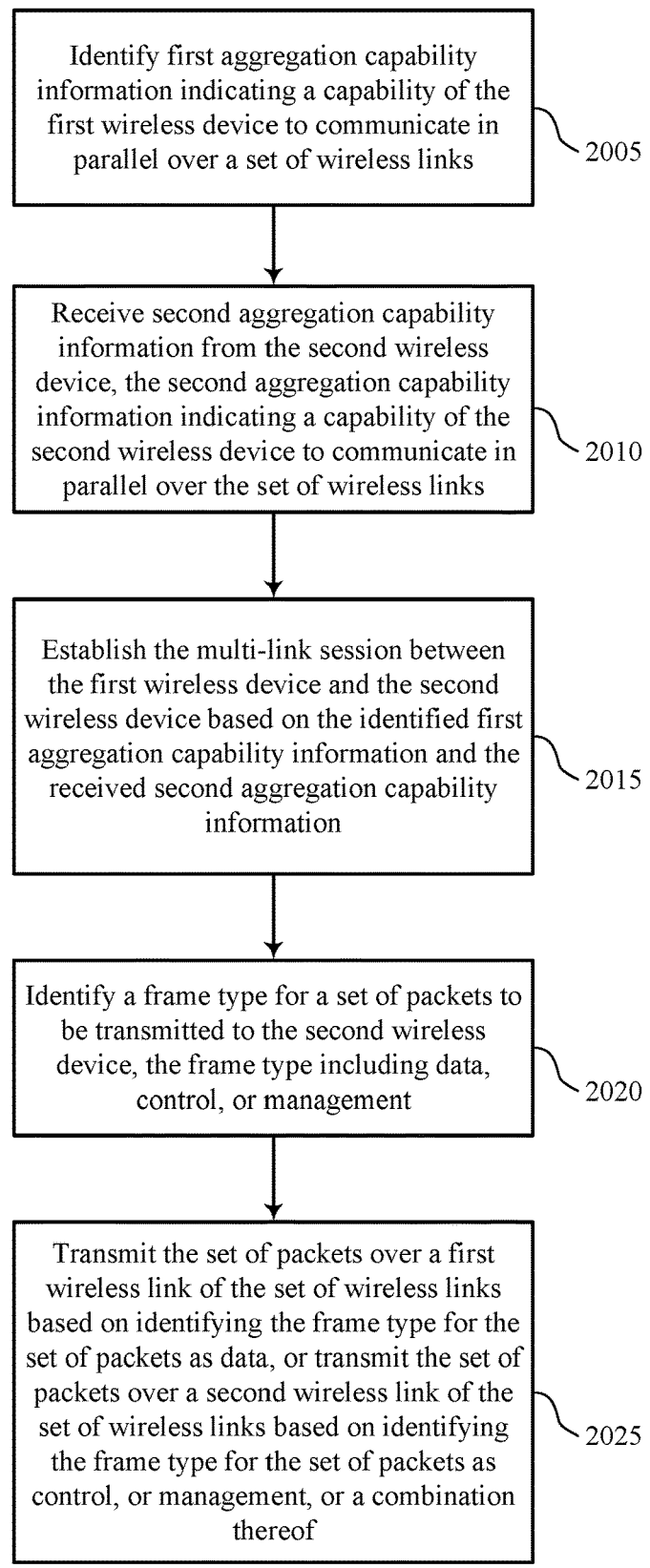

FIG. 20 shows a flowchart illustrating a method 2000 for signaling for link aggregation setup and reconfiguration in accordance with aspects of the present disclosure. The operations of method 2000 may be implemented by a STA 115, an AP 105, or any of the wireless devices (e.g., wireless device 305) or its components as described herein. For example, the operations of method 2000 may be performed by a communications manager as described with reference to FIGS. 7 through 10. In some examples, a wireless device may execute a set of codes to control the functional elements of the device to perform the functions described below. Additionally or alternatively, the wireless device may perform aspects of the functions described below using special-purpose hardware.

At 2005 the wireless device may identify first aggregation capability information indicating a capability of the first wireless device to communicate in parallel over a plurality of wireless links. The operations of 2005 may be performed according to the methods described herein. In certain examples, aspects of the operations of 2005 may be performed by a aggregation capability identifier as described with reference to FIGS. 7 through 10.

At 2010 the wireless device may receive second aggregation capability information from the second wireless device, the second aggregation capability information indicating a capability of the second wireless device to communicate in parallel over the plurality of wireless links. The operations of 2010 may be performed according to the methods described herein. In certain examples, aspects of the operations of 2010 may be performed by a aggregation capability manager as described with reference to FIGS. 7 through 10.

At 2015 the wireless device may establish the multi-link session between the first wireless device and the second wireless device based at least in part on the identified first aggregation capability information and the received second aggregation capability information. The operations of 2015 may be performed according to the methods described herein. In certain examples, aspects of the operations of 2015 may be performed by a multi-link session manager as described with reference to FIGS. 7 through 10.

At 2020 the wireless device may identify a frame type for a set of packets to be transmitted to the second wireless device, the frame type comprising data, control, or management. The operations of 2020 may be performed according to the methods described herein. In certain examples, aspects of the operations of 2020 may be performed by a packet controller as described with reference to FIGS. 7 through 10.

At 2025 the wireless device may transmit the set of packets over a first wireless link of the plurality of wireless links based at least in part on identifying the frame type for the set of packets as data, or transmit the set of packets over a second wireless link of the plurality of wireless links based at least in part on identifying the frame type for the set of packets as control, or management, or a combination thereof. The operations of 2025 may be performed according to the methods described herein. In certain examples, aspects of the operations of 2025 may be performed by a packet controller as described with reference to FIGS. 7 through 10.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, WLANs 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
   a processor;
   memory in electronic communication with the processor; and
   instructions stored in the memory and operable, when executed by the processor to cause the apparatus to:
   identify first aggregation capability information indicating a capability of a first wireless device to communicate in parallel over a plurality of wireless links and indicating an association between one or more first traffic identifiers (TIDs) and the plurality of wireless links;

receive second aggregation capability information from a second wireless device, the second aggregation capability information indicating a capability of the second wireless device to communicate in parallel over the plurality of wireless links and indicating an association between one or more second TIDs and the plurality of wireless links;

identify, based at least in part on the first aggregation capability information and the second aggregation capability information, an association between a first set of one or more TIDs and a first set of one or more wireless links of the plurality of wireless links and between a second set of one or more TIDs and a second set of one or more wireless links of the plurality of wireless links; and establish the multi-link session between the first wireless device and the second wireless device based at least in part on the identified first aggregation capability information, the received second aggregation capability information, and the association.

2. The apparatus of claim 1, wherein the instructions are further executable by the processor to:

transmit a request for the second aggregation capability information of the second wireless device, wherein the second aggregation capability information is received from the second wireless device based at least in part on the transmitted request.

3. The apparatus of claim 1, wherein the instructions are further executable by the processor to:

receive a management frame, a control frame, or a data frame that includes the second aggregation capability information.

4. The apparatus of claim 3, wherein the management frame, the control frame, or the data frame comprises a beacon, or a probe response, or an association response, or a dedicated action frame, or a control field in the management frame, or a control field in the control frame, or a control field in the data frame, or a combination thereof.

5. The apparatus of claim 1, wherein the instructions are further executable by the processor to:

receive a request for the first aggregation capability information from the second wireless device; and transmit, to the second wireless device in response to the received request, the first aggregation capability information of the first wireless device.

6. The apparatus of claim 5, wherein the first aggregation capability information comprises an indication of a duration for which the first wireless device is willing to communicate in parallel over the plurality of wireless links.

7. The apparatus of claim 5, wherein the instructions are further executable by the processor to:

receive a management frame, a control frame, or a data frame that includes the request for the first aggregation capability information.

8. The apparatus of claim 7, wherein the management frame, the control frame, or the data frame comprises a probe request, or an association request, or a dedicated action frame, or a control field in the management frame, or a control field in the control frame, or a control field in the data frame, or a combination thereof.

9. The apparatus of claim 5, wherein the second aggregation capability information is received with the received request for the first aggregation capability information.

10. The apparatus of claim 1, wherein the instructions are further executable by the processor to:

advertise the first aggregation capability information of the first wireless device.

11. The apparatus of claim 1, wherein the first aggregation capability information, or the second aggregation capability information, or both comprise an aggregation type, or link identification information, or a receive queue size, or a block acknowledgement bitmap size, or an indication of fragmentation support, or a combination thereof.

12. The apparatus of claim 1, wherein at least one of the plurality of wireless links comprises a channel in a shared radio frequency spectrum band.

13. A method for wireless communication, comprising:

identifying first aggregation capability information indicating a capability of a first wireless device to communicate in parallel over a plurality of wireless links and indicating an association between one or more first traffic identifiers (TIDs) and the plurality of wireless links;

receiving second aggregation capability information from a second wireless device, the second aggregation capability information indicating a capability of the second wireless device to communicate in parallel over the plurality of wireless links and indicating an association between one or more second TIDs and the plurality of wireless links;

identifying based at least in part on the first aggregation capability information and the second aggregation capability information, an association between a first set of one or more TIDs and a first set of one or more wireless links of the plurality of wireless links and between a second set of one or more TIDs and a second set of one or more wireless links of the plurality of wireless links; and establishing the multi-link session between the first wireless device and the second wireless device based at least in part on the identified first aggregation capability information, the received second aggregation capability information, and the association.

14. The method of claim 13, further comprising:

transmitting a request for the second aggregation capability information of the second wireless device, wherein the second aggregation capability information is received from the second wireless device based at least in part on the transmitted request.

15. The method of claim 13, further comprising:

receiving a request for the first aggregation capability information from the second wireless device; and transmitting, to the second wireless device in response to the received request, the first aggregation capability information of the first wireless device.

16. An apparatus for wireless communication, comprising:

means for identifying first aggregation capability information indicating a capability of a first wireless device to communicate in parallel over a plurality of wireless links and indicating an association between one or more first traffic identifiers (TIDs) and the plurality of wireless links;

means for receiving second aggregation capability information from a second wireless device, the second aggregation capability information indicating a capability of the second wireless device to communicate in parallel over the plurality of wireless links and indicating an association between one or more second TIDs and the plurality of wireless links;

means for identifying based at least in part on the first aggregation capability information and the second aggregation capability information, an association between a first set of one or more TIDs and a first set of one or more wireless links of the plurality of wireless links and between a second set of one or more TIDs and a second set of one or more wireless links of the plurality of wireless links; and means for establishing the multi-link session between the first wireless device and the second wireless device based at least in part on the identified first aggregation capability information, the received second aggregation capability information, and the association.

17. A non-transitory computer-readable medium storing code for wireless communication, the code comprising instructions executable by a processor to:

identify first aggregation capability information indicating a capability of a first wireless device to communicate in parallel over a plurality of wireless links and indicating an association between one or more first traffic identifiers (TIDs) and the plurality of wireless links;

receive second aggregation capability information from the second wireless device, the second aggregation capability information indicating a capability of a second wireless device to communicate in parallel over the plurality of wireless links and indicating an association between one or more second TIDs and the plurality of wireless links;

identify, based at least in part on the first aggregation capability information and the second aggregation capability information, an association between a first set of one or more TIDs and a first set of one or more wireless links of the plurality of wireless links and between a second set of one or more TIDs and a second set of one or more wireless links of the plurality of wireless links; and establish the multi-link session between the first wireless device and the second wireless device based at least in part on the identified first aggregation capability information, the received second aggregation capability information, and the association.

18. The apparatus of claim 1, wherein the instructions to identify the association comprise instructions to:
identify that each TID of the first set of one or more TIDs is associated with each of the plurality of links and that each TID of the second set of one or more TIDs is associated with each of the plurality of links.

19. The apparatus of claim 1, wherein the instructions to identify the association comprise instructions to:
identify that the first set of one or more TIDs comprises a first subset of the plurality of TIDs, wherein the first set of one or more links comprises a first subset of the plurality of links; and
identify that the second set of one or more TIDs comprises a second subset of the plurality of TIDs different from the first subset of the plurality of TIDs, wherein the second set of one or more links comprises a second subset of the plurality of links.

20. The apparatus of claim 1, wherein the instructions to identify the association comprise instructions to:
identify that the first set of one or more TIDs or the second set of one or more TIDs comprises a plurality of all available TIDs; and
identify that the first set of one or more links or the second set of one or more links comprises a subset of the plurality of links.

21. The apparatus of claim 1, wherein the instructions to identify the association comprise instructions to:
identify that the first set of one or more TIDs or the second set of one or more TIDs comprises a subset of a plurality available TIDs; and
identify that the first set of one or more links or the second set of one or more links comprises the plurality of links.

* * * * *